US012659092B2

(12) United States Patent
Hosseini et al.

(10) Patent No.: US 12,659,092 B2
(45) Date of Patent: Jun. 16, 2026

(54) ANTENNA RECYCLING FOR CARRIER AGGREGATION

(71) Applicant: QUALCOMM Incorporated, San Diego, CA (US)

(72) Inventors: Kianoush Hosseini, San Diego, CA (US); Jing Jiang, San Diego, CA (US); Peter Gaal, San Diego, CA (US); Kazuki Takeda, Minato-ku (JP); Jing Lei, San Diego, CA (US); Hari Sankar, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 18/469,430

(22) Filed: Sep. 18, 2023

(65) Prior Publication Data

US 2025/0096960 A1      Mar. 20, 2025

(51) Int. Cl.
*H04L 5/00* (2006.01)
*H04W 72/1273* (2023.01)
*H04W 72/232* (2023.01)

(52) U.S. Cl.
CPC .......... *H04L 5/0023* (2013.01); *H04L 5/0053* (2013.01); *H04W 72/1273* (2013.01); *H04W 72/232* (2023.01)

(58) Field of Classification Search
CPC ..... H04L 5/001; H04L 5/0023; H04L 5/0053; H04L 5/0091; H04W 72/1273; H04W 72/232; H04W 72/51
See application file for complete search history.

(56) References Cited

U.S. PATENT DOCUMENTS

| | | | | |
|---|---|---|---|---|
| 2012/0213154 A1* | 8/2012 | Gaal | .................... | H04B 7/0608 |
| | | | | 370/328 |
| 2013/0329665 A1* | 12/2013 | Kadous | ................. | H04L 5/0007 |
| | | | | 370/329 |
| 2015/0237548 A1* | 8/2015 | Luo | ........................ | H04W 36/06 |
| | | | | 370/329 |
| 2015/0271847 A1* | 9/2015 | Luo | ........................ | H04L 5/0048 |
| | | | | 370/329 |
| 2016/0242182 A1* | 8/2016 | Chen | ...................... | H04W 76/15 |
| 2016/0374069 A1* | 12/2016 | Palm | ...................... | H04W 72/51 |
| 2018/0270824 A1* | 9/2018 | Jung | ...................... | H04W 72/56 |
| 2019/0097696 A1* | 3/2019 | Kumar | ................. | H04B 7/0817 |
| 2019/0182898 A1* | 6/2019 | Yu | ....................... | H04B 7/06958 |
| 2020/0067615 A1* | 2/2020 | Ghanbarinejad | .. | H04B 7/06968 |
| 2021/0068077 A1* | 3/2021 | Raghavan | ............ | H04B 7/0802 |
| 2021/0100014 A1* | 4/2021 | Kong | ................ | H04W 72/0453 |

(Continued)

OTHER PUBLICATIONS

International Search Report and Written Opinion—PCT/US2024/044558—ISA/EPO—Dec. 16, 2024 (2306710WO).

*Primary Examiner* — Benjamin H Elliott, IV
(74) *Attorney, Agent, or Firm* — Holland & Hart LLP

(57) ABSTRACT

Methods, systems, and devices for wireless communications are described. A user equipment (UE) may transmit an indication of a capability of the UE to receive downlink transmissions over a plurality of component carriers with a first quantity of antennas. The UE may receive, in accordance with the indication of the capability of the UE, the downlink transmissions with at least a subset of the first quantity of antennas and over at least a subset of the plurality of component carriers.

29 Claims, 13 Drawing Sheets

(56) References Cited

U.S. PATENT DOCUMENTS

| | | | |
|---|---|---|---|
| 2021/0204361 A1* | 7/2021 | Yu | H04B 7/06958 |
| 2022/0225305 A1* | 7/2022 | Venugopal | H04B 7/0628 |
| 2023/0353218 A1* | 11/2023 | Yoon | H04L 5/0057 |
| 2024/0080829 A1* | 3/2024 | Wei | H04W 72/0453 |
| 2024/0372569 A1* | 11/2024 | Pehlke | H04B 7/0413 |
| 2025/0096960 A1* | 3/2025 | Hosseini | H04W 72/1273 |
| 2025/0158772 A1* | 5/2025 | Matsumura | H04L 5/0051 |
| 2025/0294573 A1* | 9/2025 | Hosseini | H04L 5/0051 |

* cited by examiner

Figure 3:
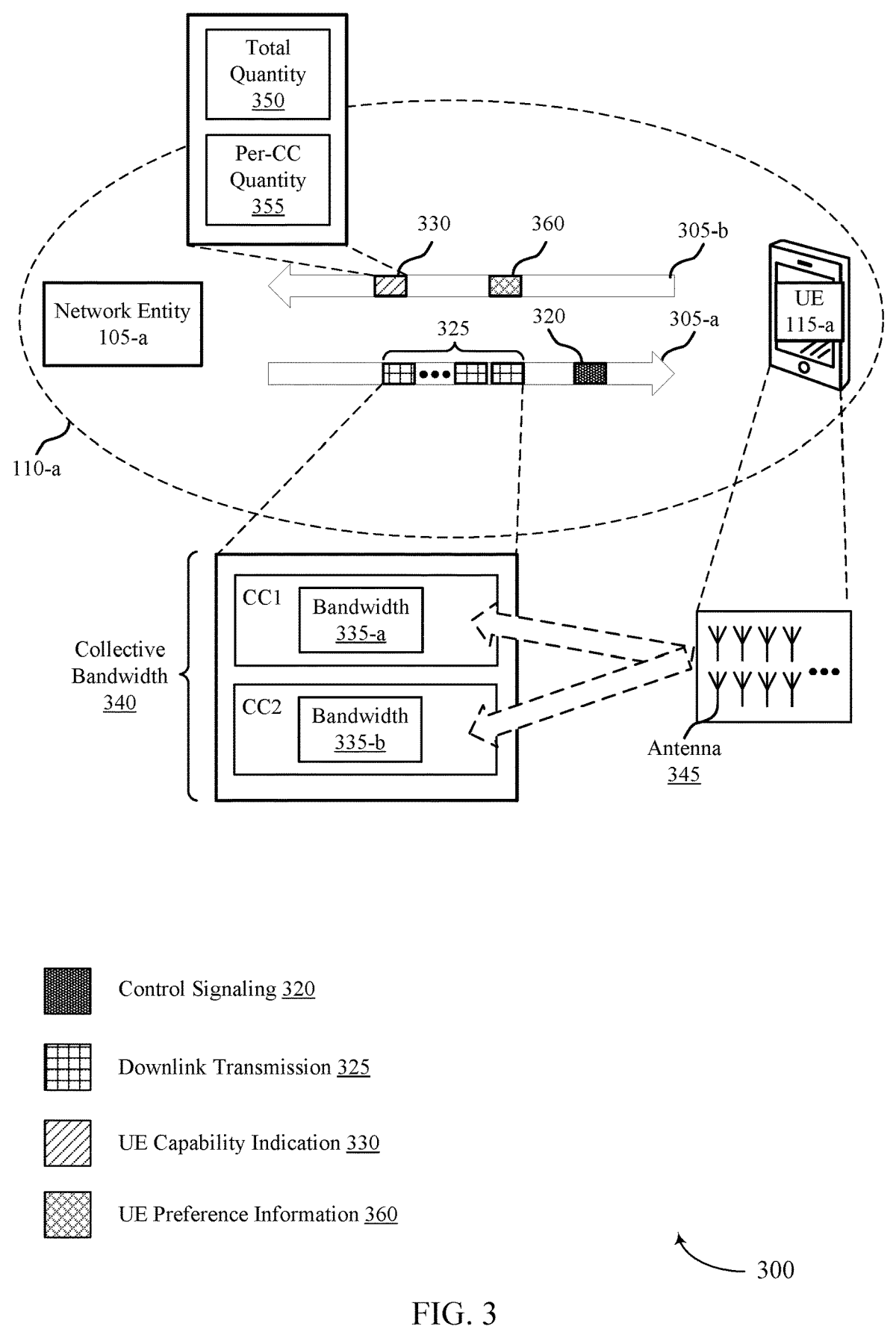

Total Quantity 350

Per-CC Quantity 355

Network Entity 105-a 330     360     305-b 325     320     305-a

UE 115-a 110-a

Collective Bandwidth 340

CC1   Bandwidth 335-a

CC2   Bandwidth 335-b

Antenna 345

Control Signaling 320

Downlink Transmission 325

UE Capability Indication 330

UE Preference Information 360

Figure 4:
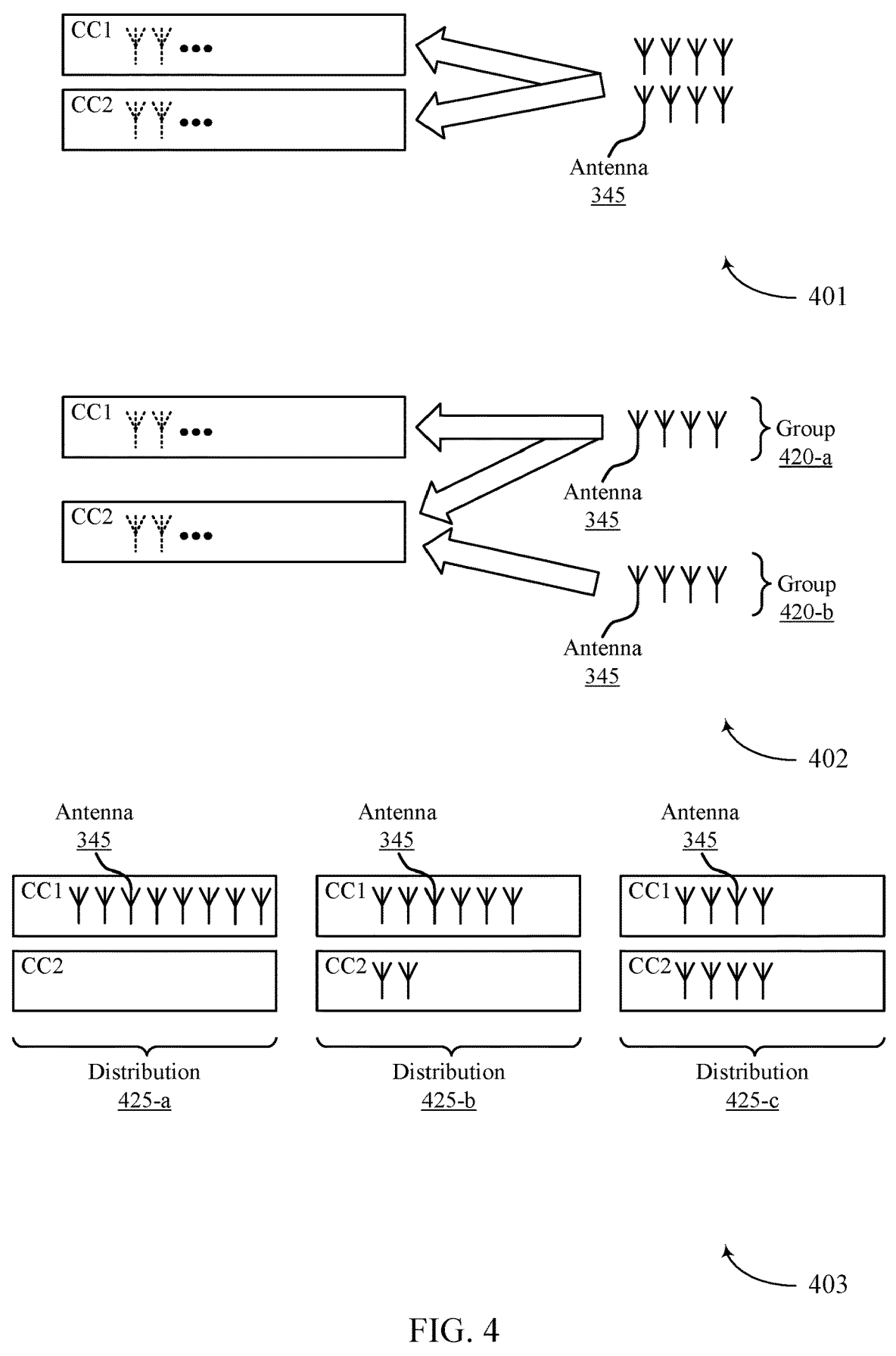

Antenna
345

401

CC1

CC2

} Group
420-a

Antenna
345

} Group
420-b

Antenna
345

402

Antenna
345

Antenna
345

Antenna
345

CC1

CC2

CC1

CC2

CC1

CC2

Distribution
425-a

Distribution
425-b

Distribution
425-c

Communications Manager

UE Capability Component

725

Downlink Transmission
Reception Component

730

720

Receiver

710

Transmitter

715

705

700

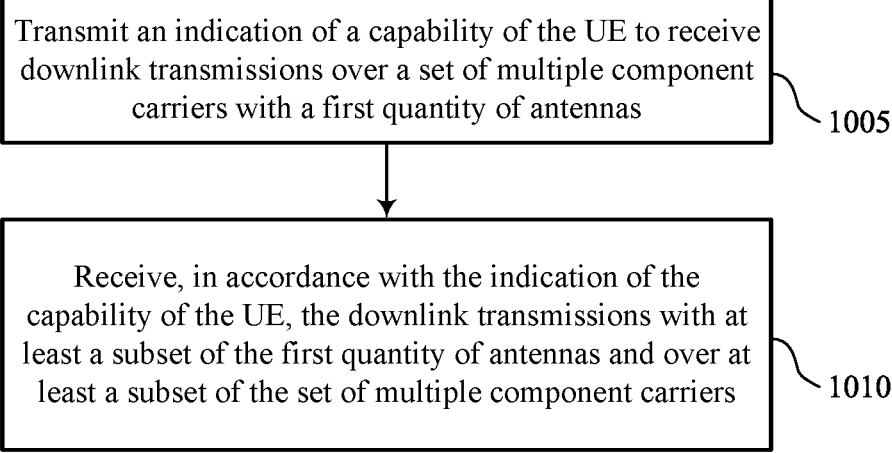

Transmit an indication of a capability of the UE to receive downlink transmissions over a set of multiple component carriers with a first quantity of antennas

1005

Receive, in accordance with the indication of the capability of the UE, the downlink transmissions with at least a subset of the first quantity of antennas and over at least a subset of the set of multiple component carriers

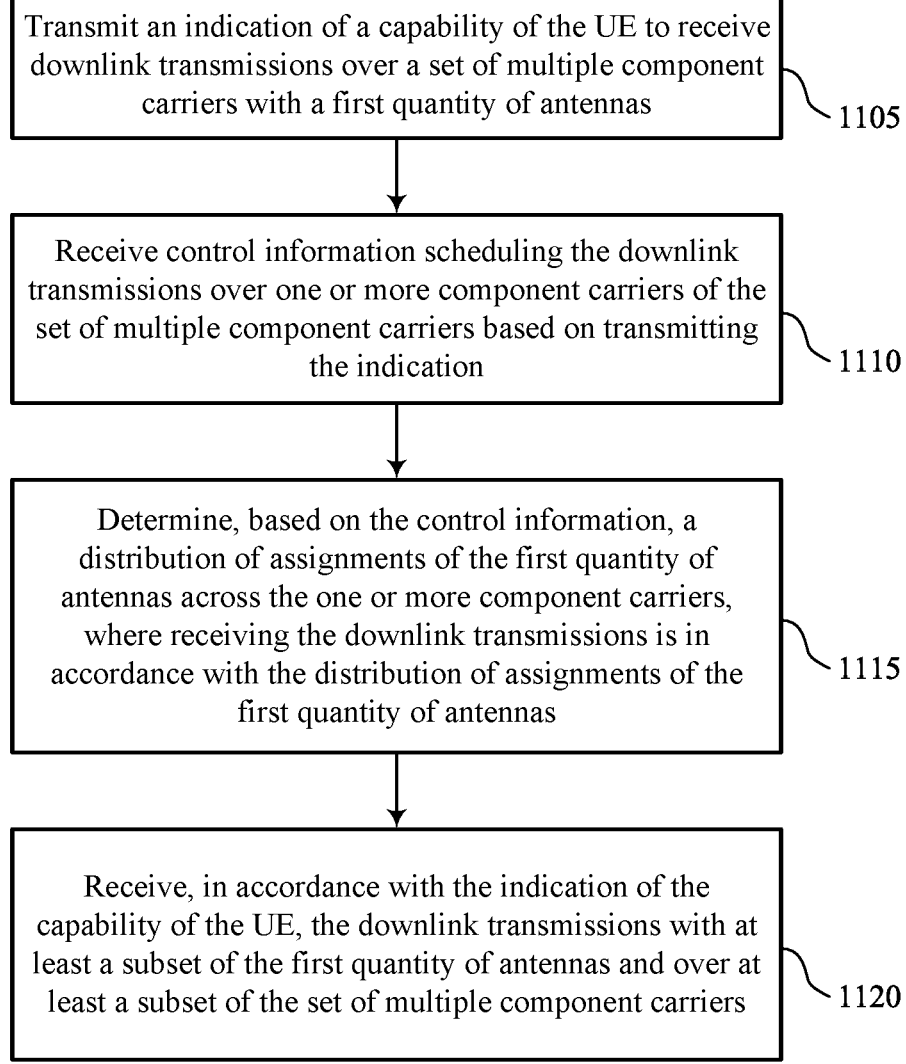

Transmit an indication of a capability of the UE to receive downlink transmissions over a set of multiple component carriers with a first quantity of antennas ⟋ 1105

Receive control information scheduling the downlink transmissions over one or more component carriers of the set of multiple component carriers based on transmitting the indication ⟋ 1110

Determine, based on the control information, a distribution of assignments of the first quantity of antennas across the one or more component carriers, where receiving the downlink transmissions is in accordance with the distribution of assignments of the first quantity of antennas ⟋ 1115

Receive, in accordance with the indication of the capability of the UE, the downlink transmissions with at least a subset of the first quantity of antennas and over at least a subset of the set of multiple component carriers ⟋ 1120

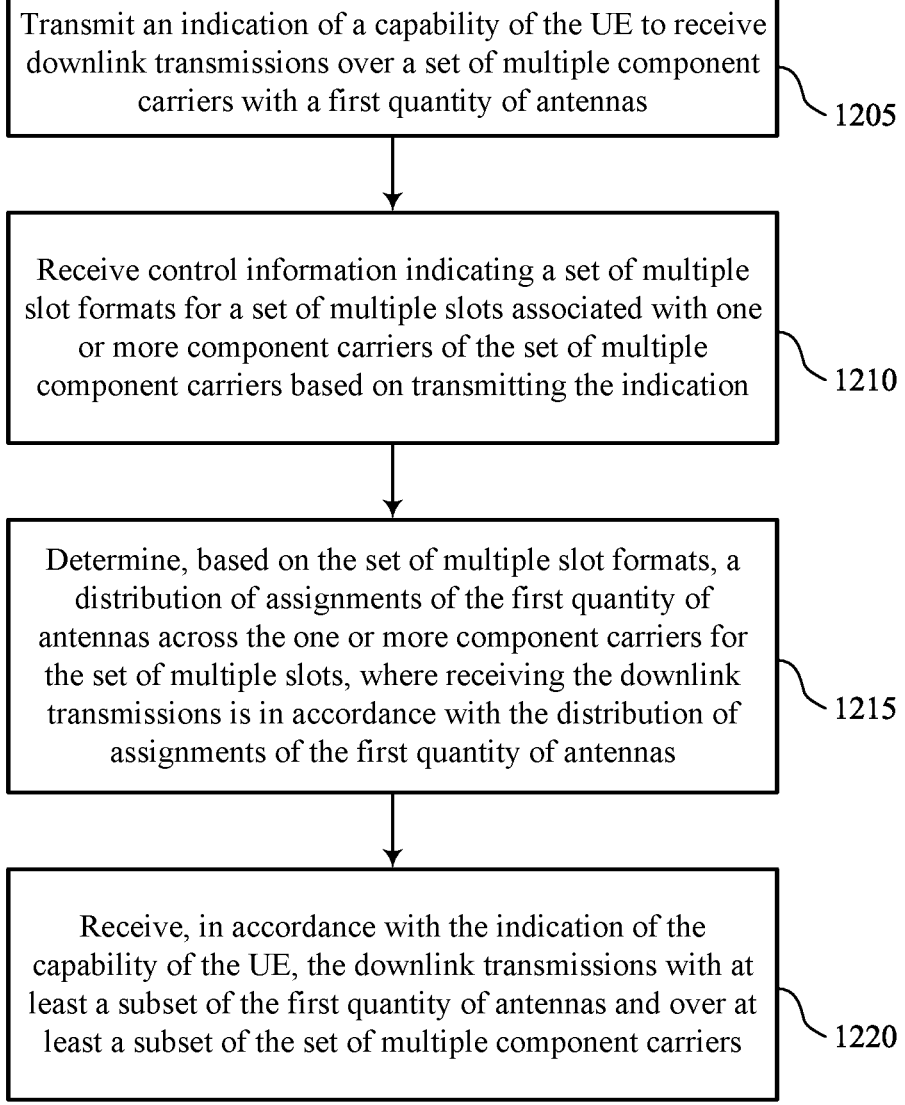

Transmit an indication of a capability of the UE to receive downlink transmissions over a set of multiple component carriers with a first quantity of antennas

1205

Receive control information indicating a set of multiple slot formats for a set of multiple slots associated with one or more component carriers of the set of multiple component carriers based on transmitting the indication

1210

Determine, based on the set of multiple slot formats, a distribution of assignments of the first quantity of antennas across the one or more component carriers for the set of multiple slots, where receiving the downlink transmissions is in accordance with the distribution of assignments of the first quantity of antennas

1215

Receive, in accordance with the indication of the capability of the UE, the downlink transmissions with at least a subset of the first quantity of antennas and over at least a subset of the set of multiple component carriers

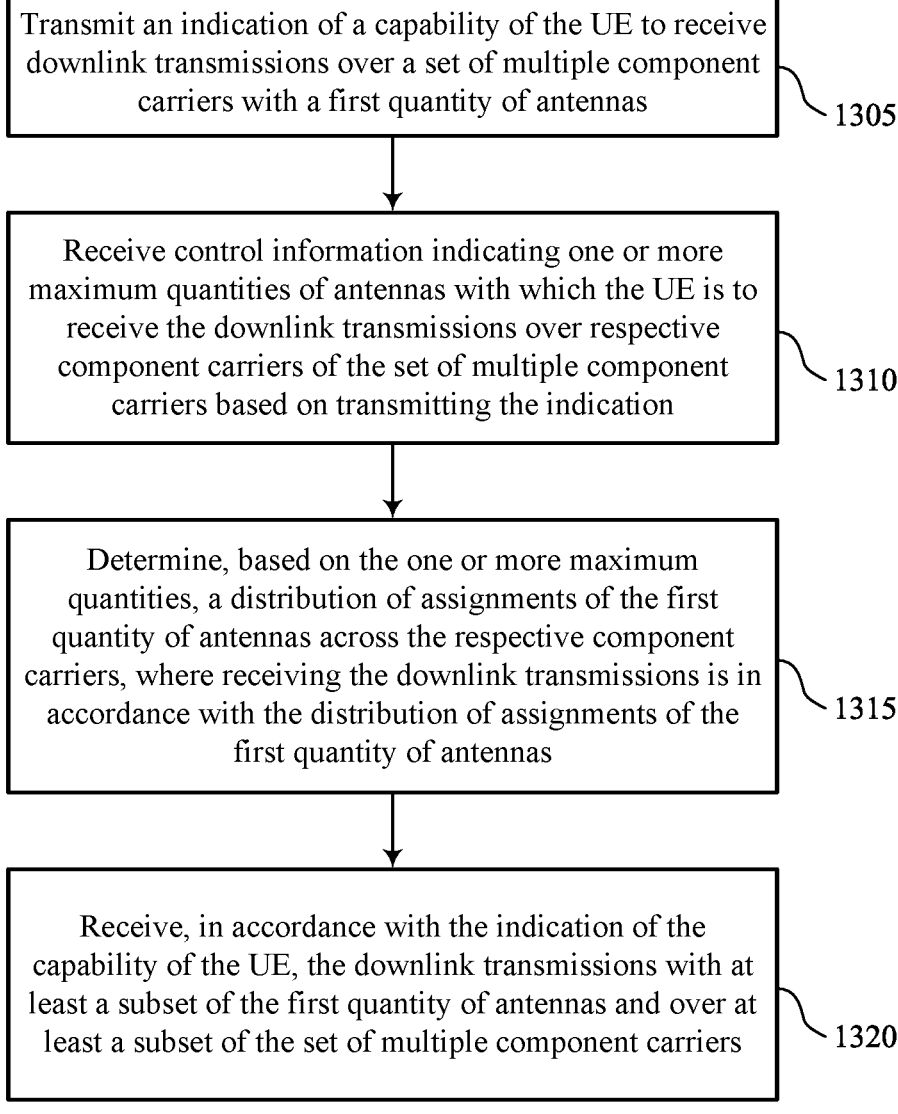

Transmit an indication of a capability of the UE to receive downlink transmissions over a set of multiple component carriers with a first quantity of antennas

1305

Receive control information indicating one or more maximum quantities of antennas with which the UE is to receive the downlink transmissions over respective component carriers of the set of multiple component carriers based on transmitting the indication

1310

Determine, based on the one or more maximum quantities, a distribution of assignments of the first quantity of antennas across the respective component carriers, where receiving the downlink transmissions is in accordance with the distribution of assignments of the first quantity of antennas

1315

Receive, in accordance with the indication of the capability of the UE, the downlink transmissions with at least a subset of the first quantity of antennas and over at least a subset of the set of multiple component carriers

ANTENNA RECYCLING FOR CARRIER AGGREGATION

FIELD OF TECHNOLOGY

The following relates to wireless communications, including antenna recycling for carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may receive communications using multiple antennas. However, such approaches may be improved.

SUMMARY

The described techniques relate to improved methods, systems, devices, and apparatuses that support antenna recycling for carrier aggregation. For example, a user equipment (UE) may transmit an indication of a capability of the UE to receive downlink transmissions over a plurality of component carriers with a first quantity of antennas. The UE may receive, in accordance with the indication of the capability of the UE, the downlink transmissions with at least a subset of the first quantity of antennas and over at least a subset of the plurality of component carriers.

A method for wireless communications by a user equipment (UE) is described. The method may include transmitting an indication of a capability of the UE to receive downlink transmissions over a set of multiple component carriers with a first quantity of antennas and receiving, in accordance with the indication of the capability of the UE, the downlink transmissions with at least a subset of the first quantity of antennas and over at least a subset of the plurality of component carriers.

A UE for wireless communications is described. The UE may include one or more memories storing processor executable code, and one or more processors coupled with the one or more memories. The one or more processors may individually or collectively operable to execute the code to cause the UE to transmit an indication of a capability of the UE to receive downlink transmissions over a set of multiple component carriers with a first quantity of antennas and receive, in accordance with the indication of the capability of the UE, the downlink transmissions with at least a subset of the first quantity of antennas and over at least a subset of the plurality of component carriers.

Another UE for wireless communications is described. The UE may include means for transmitting an indication of a capability of the UE to receive downlink transmissions over a set of multiple component carriers with a first quantity of antennas and means for receiving, in accordance with the indication of the capability of the UE, the downlink transmissions with at least a subset of the first quantity of antennas and over at least a subset of the plurality of component carriers.

A non-transitory computer-readable medium storing code for wireless communications is described. The code may include instructions executable by a processor to transmit an indication of a capability of the UE to receive downlink transmissions over a set of multiple component carriers with a first quantity of antennas and receive, in accordance with the indication of the capability of the UE, the downlink transmissions with at least a subset of the first quantity of antennas and over at least a subset of the plurality of component carriers.

Some examples of the method, user equipment (UEs), and non-transitory computer-readable medium described herein may further include operations, features, means, or instructions for receiving control information scheduling the downlink transmissions over the subset of the plurality of component carriers based on transmitting the indication and determining, based on the control information, a distribution of assignments of the first quantity of antennas across the one or more component carriers, where receiving the downlink transmissions may be in accordance with the distribution of assignments of the first quantity of antennas, where the distribution of assignments comprises assignment of different quantities of antennas to different downlink time periods in the one or more component carriers.

In some examples of the method, user equipment (UEs), and non-transitory computer-readable medium described herein, the control information specifies one or more durations for switching antennas following at least one downlink transmission of the downlink transmissions and the one or more durations may be defined as time periods for processing the downlink transmissions.

Some examples of the method, user equipment (UEs), and non-transitory computer-readable medium described herein may further include operations, features, means, or instructions for receiving control information indicating a set of multiple slot formats for a set of multiple slots associated with one or more component carriers of the plurality of component carriers based on transmitting the indication and determining, based on the set of multiple slot formats, a distribution of assignments of the first quantity of antennas across the one or more component carriers for the set of multiple slots, where receiving the downlink transmissions may be in accordance with the distribution of assignments of the first quantity of antennas, where the distribution of assignments comprises assignment of different quantities of antennas to different downlink time periods in the one or more component carriers.

Some examples of the method, user equipment (UEs), and non-transitory computer-readable medium described herein may further include operations, features, means, or instructions for receiving control information indicating one or more maximum quantities of antennas with which the UE may be to receive the downlink transmissions over respective component carriers of the plurality of component carriers based on transmitting the indication and determining, based on the one or more maximum quantities, a distribution of assignments of the first quantity of antennas across the respective component carriers, where receiving the downlink transmissions may be in accordance with the distribution of assignments of the first quantity of antennas, where the distribution of assignments comprises assignment of different quantities of antennas to different downlink time periods in the one or more component carriers.

In some examples of the method, user equipment (UEs), and non-transitory computer-readable medium described herein, the capability of the UE further indicates a second quantity of antennas with which the UE may be capable of receiving downlink transmissions over a single component carrier of the plurality of component carriers and receiving the downlink transmissions includes receiving the downlink transmissions in accordance with the second quantity of antennas.

In some examples of the method, user equipment (UEs), and non-transitory computer-readable medium described herein, the second quantity of antennas may be based on a bandwidth associated with the single component carrier.

In some examples of the method, user equipment (UEs), and non-transitory computer-readable medium described herein, the bandwidth associated with the single component carrier may be a downlink component carrier bandwidth, an active downlink bandwidth part bandwidth, or a bandwidth of a downlink data channel.

In some examples of the method, user equipment (UEs), and non-transitory computer-readable medium described herein, the first quantity of antennas may be based on a bandwidth associated with the plurality of component carriers.

In some examples of the method, user equipment (UEs), and non-transitory computer-readable medium described herein, the bandwidth associated with the plurality of component carriers may be a downlink component carrier bandwidth, an active downlink bandwidth part bandwidth, or a bandwidth of a downlink data channel.

In some examples of the method, user equipment (UEs), and non-transitory computer-readable medium described herein, the capability of the UE further indicates one or more distributions of assignments of the first quantity of antennas across the plurality of component carriers.

In some examples of the method, user equipment (UEs), and non-transitory computer-readable medium described herein, the capability of the UE further indicates a subset of the first quantity of antennas that may be permitted to receive the downlink transmissions only on a subset of the plurality of component carriers.

In some examples of the method, user equipment (UEs), and non-transitory computer-readable medium described herein, the capability of the UE further indicates that any of the first quantity of antennas may be permitted to receive the downlink transmissions on any of the plurality of component carriers.

Some examples of the method, user equipment (UEs), and non-transitory computer-readable medium described herein may further include operations, features, means, or instructions for transmitting a requested distribution of assignments of the first quantity of antennas across at least the subset of the plurality of component carriers, where receiving the downlink transmissions includes receiving the downlink transmissions in accordance with the requested distribution of assignments of the first quantity of antennas.

Some examples of the method, user equipment (UEs), and non-transitory computer-readable medium described herein may further include operations, features, means, or instructions for receiving, in accordance with the capability of the UE, control information scheduling transmission of the downlink transmissions over at least the subset of the plurality of component carriers.

Some examples of the method, user equipment (UEs), and non-transitory computer-readable medium described herein may further include operations, features, means, or instructions for transmitting an indication of a requested slot format pattern for communications, where receiving the downlink transmissions includes receiving the downlink transmissions in accordance with the requested slot format pattern.

In some examples of the method, user equipment (UEs), and non-transitory computer-readable medium described herein, the capability of the UE includes a capability to receive the downlink transmissions over a quantity of communications layers that may be different than the first quantity of antennas.

In some examples of the method, user equipment (UEs), and non-transitory computer-readable medium described herein, the capability of the UE may be enabled based on the downlink transmissions being scheduled in one or more frequency bands that support the capability of the UE, one or more band combinations that support the capability of the UE, one or more frequency ranges that support the capability of the UE, or any combination thereof.

BRIEF DESCRIPTION OF THE DRAWINGS

FIG. 3 shows an example of a wireless communications system that supports antenna recycling for carrier aggregation in accordance with one or more examples as disclosed herein.

FIG. 4 shows examples of assignment schemes that support antenna recycling for carrier aggregation in accordance with one or more examples as disclosed herein.

FIGS. 10 through 13 show flowcharts illustrating methods that support antenna recycling for carrier aggregation in accordance with one or more examples as disclosed herein.

DETAILED DESCRIPTION

Figure 1:
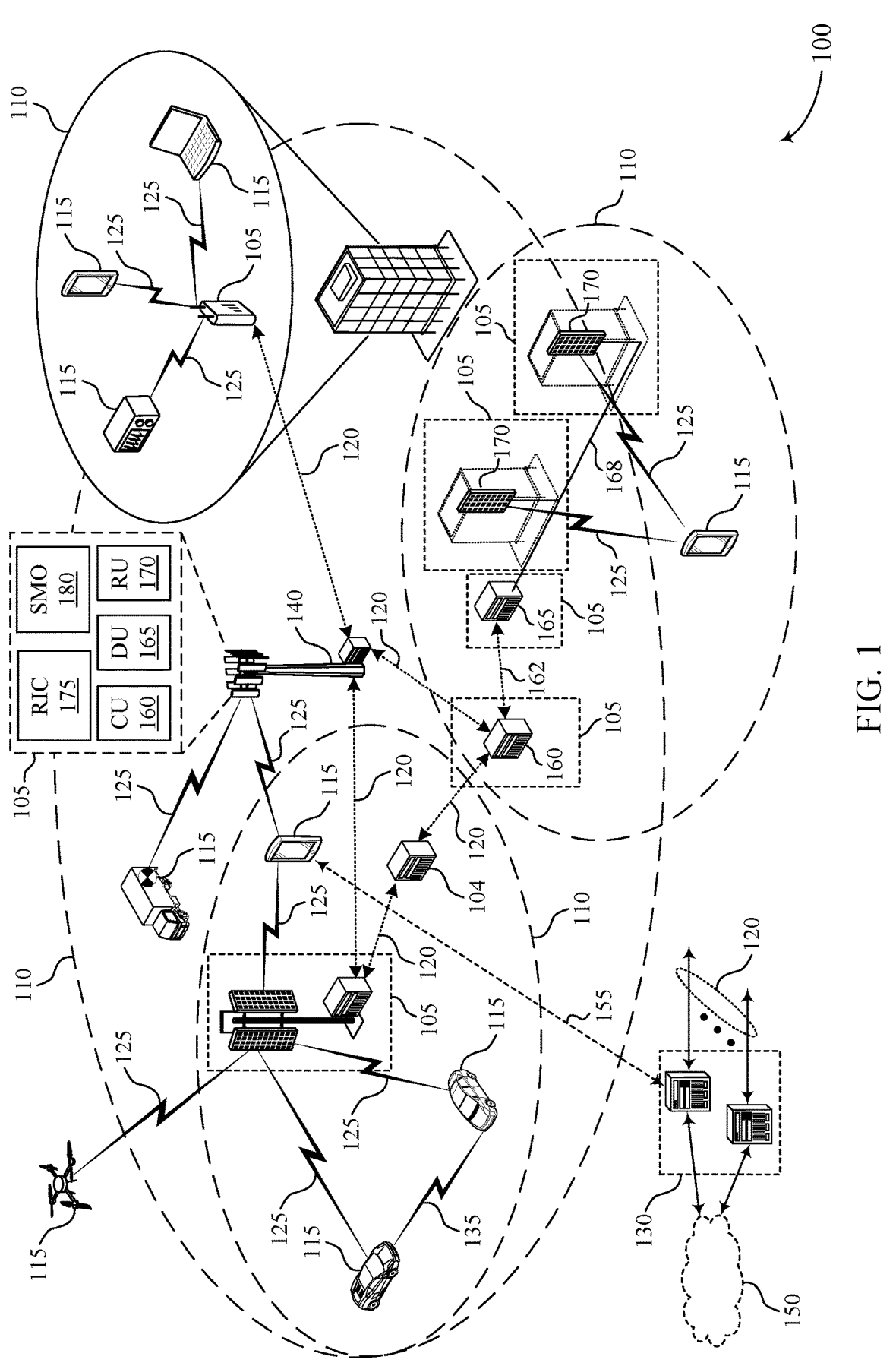
FIG. 1 shows an example of a wireless communications system that supports antenna recycling for carrier aggregation in accordance with one or more examples as disclosed herein.

In wireless communications, a user equipment (UE) may communicate over multiple component carriers (CCs) in a carrier aggregation (CA) scenario. To facilitate such communications, the UE may report a quantity of antennas (e.g., receive antennas) over which the UE is capable of communicating on a per-CC basis. However, in some approaches, this quantity is fixed and may not be modified. As such, this may lead to situations in which some antennas may not be utilized. For example, in some approaches, a UE may report a quantity of receive antennas (e.g., four) for each of a first CC and a second CC. In a slot where one serving cell is communicating in a downlink direction and the other serving cell is communicating in an uplink direction, the UE could only utilize four of the UE's receive antennas and the other four antennas would be unused, resulting in inefficient use of resources and reduced communications quality and reliability.

Techniques for antenna recycling and associated reporting may be employed. For example, the UE may flexibly distribute assignments of receive antennas across multiple CCs. The quantity of receive antennas may correspond to a quantity of MIMO layers over which the UE is capable of communicating. Additionally, or alternatively, the quantity of receive antennas may be different than the quantity of MIMO layers (e.g., the quantity of receive antennas may be greater than or equal to the quantity of MIMO layers). In some examples, the quantity of receive antennas and the quantity of MIMO layers may be adjusted or selected independent of one another (e.g., while maintaining the quantity of receive antennas to be greater than or equal to the quantity of MIMO layers). The UE may report a quantity (e.g., a maximum quantity) of antennas with which the UE is capable of communicating over the multiple CCs and the quantity may be a collective quantity of antennas for some or all of the multiple CCs (as opposed to individual quantities of antennas for individual CCs). The UE may also flexibly distribute assignments for the antennas across the multiple CCs in different ways. For example, the UE may distribute such assignments based on a set of possible distributions or one or more minimum quantities of antennas that are to be assigned to individual CCs. In some examples, the UE may support a same quantity of MIMO layers, a greater quantity of MIMO layers, or a reduced quantity of MIMO layers, for the same quantity of receive antennas that are to be assigned. In some examples, the quantity of MIMO layers that is supported may depend on one or more factors, and a network entity and the UE may communicate to determine or select the quantity of MIMO layers that are to be supported for communications between the UE and the network entity. The UE may support semi-static antenna assignment, in which the UE determines the distribution of antennas across the CCs based on slot formats or received signaling that indicates quantities of antennas for the different CCs. The UE may support dynamic antenna switching, in which the UE determines the distribution of antennas across the CCs based on scheduling information (e.g., whether a transmission is scheduled on a CC or not). In this way, the UE may increase antenna utilization in various scenarios, thereby increasing antenna utilization, communications quality, and communications reliability.

Aspects of the disclosure are initially described in the context of wireless communications systems. Aspects of the disclosure are then described with reference to slot format patterns, a wireless communications system, assignment schemes, and a process flow. Aspects of the disclosure are further illustrated by and described with reference to apparatus diagrams, system diagrams, and flowcharts that relate to antenna recycling for carrier aggregation.

FIG. 1 shows an example of a wireless communications system 100 that supports antenna recycling for carrier aggregation in accordance with one or more examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (cNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support antenna recycling for carrier aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier band-width may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier band-widths. In some examples, the wireless communications system 100 may include network entities 105 or UEs 115 that support concurrent communications using carriers asso-ciated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modu-lation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quan-tity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a sup-ported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-num-bered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multi-plexed for signaling via a downlink carrier, for example, using one or more of time division multiplexing (TDM) techniques, frequency division multiplexing (FDM) tech-niques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication cov-erage via one or more cells, for example a macro cell, a small cell, a hot spot, or other types of cells, or any combination thereof. The term "cell" may refer to a logical communica-tion entity used for communication with a network entity 105 (e.g., using a carrier) and may be associated with an identifier for distinguishing neighboring cells (e.g., a physi-cal cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlap-ping with coverage areas 110, among other examples.

A macro cell generally covers a relatively large geo-graphic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality that satisfies one or more thresholds based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the UE 115 may employ antenna recycling or flexible assignments for wireless communications and may distribute assignments of antennas across multiple CCs in a semi-static or a dynamic manner. For example, the UE 115 may report (e.g., to the network entity 105) that the UE 115 supports such flexible assignment or recycling of antennas across multiple CCs (e.g., indicating a quantity of antennas with which the UE 115 may receive downlink transmissions of a plurality of CCs). The UE 115 may determine such flexible antenna assignments for the various CCs and may receive downlink transmissions over the various CCs using the determined antenna assignments, thereby improving throughput of the wireless communications, increasing reliability, and improving communications quality.

Figure 2:
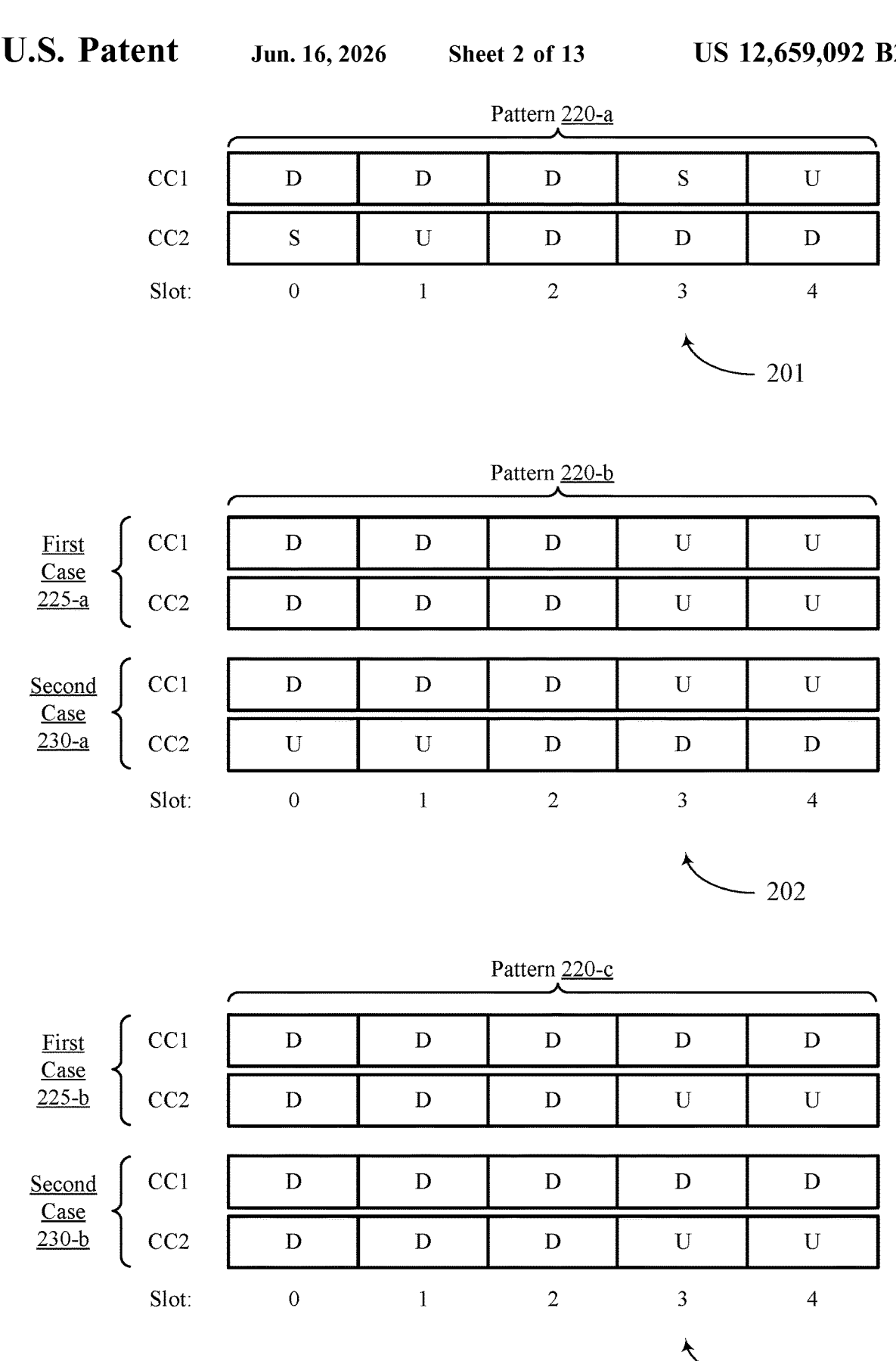
FIG. 2 shows examples of carrier aggregation scenarios that support antenna recycling for carrier aggregation in accordance with one or more examples as disclosed herein.

FIG. 2 shows examples of various carrier aggregation scenarios that support antenna recycling for carrier aggregation in accordance with one or more examples as disclosed herein.

In wireless communications, a UE may receive communications via one or more antennas. Such communications may involve the use of one or more layers (e.g., multiple input multiple output (MIMO) layers). In some examples, a layer may correspond to an antenna, or an antenna may correspond to a layer. As such, references to one or more layers may also be interpreted to be, in some cases, a reference to one or more corresponding antennas.

However, in other examples, a quantity of layers may not directly correspond to a quantity of antennas (e.g., the quantity of layers and the quantity of antennas may be different). For example, a quantity of receive antennas and a quantity of MIMO layers may be adjusted or selected independent of one another (e.g., while maintaining the quantity of receive antennas to be greater than or equal to the quantity of MIMO layers). In some examples, the UE may support a same quantity of MIMO layers, a greater quantity of MIMO layers, or a reduced quantity of MIMO layers (e.g., relative to a previous quantity of MIMO layers) for the same quantity of receive antennas that are to be assigned. In some examples, the quantity of MIMO layers that is supported may depend on one or more factors, and a network entity and the UE may communicate to determine or select the quantity of MIMO layers that are to be supported for communications between the UE and the network entity.

In wireless communications, a UE may report a quantity (e.g., a maximum quantity or other quantity) of antennas with which the UE may receive transmissions on a per-CC basis in a given band of a band combination basis (e.g., a feature set per carrier (FSPC) basis). In other words, in a given scenario, the UE may indicate how many different antennas or layers with which it can communicate on one or more CCs. However, in some approaches, this quantity of antennas per CC is fixed and cannot be modified. For example, consider a UE with 8 receive (RX) antennas configured with 2 CCs across two different TDD bands, and that the UE has reported a quantity of antennas to be four for each of the two CCs. In a slot where both serving cells are in the downlink direction (e.g., regardless of the bandwidth available in each CC), a UE may operate with 4 layers in each CC. In accordance with the reported quantity, in a slot where one serving cell is in the downlink direction and the other one in the uplink direction, a UE could only utilize 4 of its antennas in the downlink CC and the other 4 cannot be used for the downlink when, assuming uplink communications do not substantially affect downlink antenna usage, the UE would otherwise be free to use all 8 antennas in the downlink CC. In some cases, a fixed combination of time division duplexing (TDD) slots may result in suboptimal throughput. For example, in a situation in which downlink and uplink slots are assigned in the same slots across CCs (e.g., when a downlink slot appears in a first CC it also appears in the second CC, and the same for uplink slots), throughput is limited. Thus, improvements to downlink communications may be desirable, including flexible antenna assignment/recycling between different carriers, associated reporting of antenna assignment capabilities across multiple CCs, or any combination thereof. By recycling the additional 4 unused antennas, a UE can support a larger number of layers or could enhance its performance by utilizing a larger quantity of antennas to receive the same number of layers.

The carrier aggregation scenario 201 depicts a carrier aggregation scenario in which a UE uses two RF chains and is capable of full-duplex operation involving CC1 and CC2 and the pattern 220-*a* is used across CC1 and CC2. The pattern may include downlink (D) slots, uplink (U) slots, sidelink(S) slots, one or more other slots, or any combination thereof. In some examples, a pattern of slots may be complementary. For example, a first CC may include a pattern of slots, and the second CC may include a shifted version of the same pattern, so that in some or all slots, when the first CC is in an U direction, the second CC may be in a D direction (as one example). Other permutations or combinations are possible and considered by this disclosure.

In a first case, the UE may report a quantity of antennas to be used (e.g., via FSPC signaling) on a per-CC basis. In such a scenario, flexible antenna assignments may not be supported. However, in a second case, flexible antenna assignments (e.g., antenna recycling) may be employed and throughput may be improved.

In some examples, throughput may be increased in the second case as compared to the first case, which may be associated with the quantity of antennas used, the quantity of layers used, or both, as well as one or more associated bandwidths. For example, in the first case (e.g., in which the quantity of antennas used per CC is 4 and the UE reports such per-CC quantities), a throughput may be 5.4 Gbps, whereas a throughput for the second case may be 6.92 Gbps, a 28% increase in throughput as a result of the flexible antenna assignments. In some cases, the bandwidth envelope may not scale linearly with a quantity of antennas used, a quantity of layers used, or both. For example, when increasing the quantity of antennas used from two to four, the envelope bandwidth that a UE is capable of supporting with a given quantity of layers may decrease by more than one half.

Carrier aggregation scenario 202 depicts a comparison of the first case 225-*a* and the second case 230-*a*, demonstrating that throughput may be increased through the use of a slot offset and flexible antenna assignment. Throughputs of different scenarios may be calculated by determining a quantity of slots that use a quantity of CCs and a quantity of antennas. For a given combination of CCs and antennas, a peak throughput may be established. For example, in a scenario including two CCs, four antennas being used, and ten out of ten slots being downlink slots, a peak throughput (assuming a peak bandwidth envelope) may be a first value (e.g., 4 Gbps). With a single CC and six antennas (assuming a peak bandwidth envelope), the peak throughput may be a second value (e.g., 3 Gbps). With 0.7 CCs and 8 antennas (assuming a peak bandwidth envelope), a peak throughput may be a third value (e.g., 2.8 Gbps).

In the first case 225-*a*, there is no slot offset. For example, the pattern 220-*b* is the same for each CC. A throughput of 2.4 Gbps may be calculated based on six of the ten slots being downlink slots that use both CC1 and CC2 (and thereby having a peak throughput of 4 Gbps). This may be expressed by the equation Tput_case1=6/10*Tput_4ant, where Tput_4ant=4 Gbps.

However, in the second case 230-*a*, an offset is employed, and the pattern 220-*b* of slot formats may be different for different CCs (e.g., a pattern for one CC may be shifted). A throughput of 3.2 Gbps may be calculated for the second case 230-*a* based on two of the ten slots being downlink slots that use both CC1 and CC2 (and thereby having a peak throughput of 4 Gbps, reduced by the quantity of such slots relative to the total amount of slots used for the peak throughput calculation) and four of the five slots (due to the use of a single CC) being downlink slots that use either CC1 or CC2 (thereby having a peak throughput of 3 Gbps, reduced by the quantity of such slots relative to the total amount of slots used for the peak throughput calculation). This may be expressed by the equation Tput_case2=2/10 Tput_4ant+8/10 Tput_6ant, where Tput_4ant=4 Gbps and Tput_6ant=3 Gbps, which gives Tput_case2=3.2 Gbps.

Thus, by including a slot offset (e.g., an offset of the pattern 220-b), flexible antenna assignments, or both, throughput may be increased.

Carrier aggregation scenario 203 depicts a comparison of the first case 225-b and the second case 230-b, demonstrating that throughput may be increased though the use of a supplemental downlink (SDL) mode (e.g., in which D-U slots may operate in a different mode than a D-D slot, permitting a different maximum quantity of available antennas) and flexible antenna assignment, even if the pattern 220-c is the same (e.g., across the first case 225-b and the second case 230-b). Similar to carrier aggregation scenario 202, the throughputs of different scenarios may be calculated by determining a quantity of slots that use a quantity of CCs and a quantity of antennas. For a given combination of CCs and antennas, a peak throughput may be established. For example, in a scenario including two CCs, four antennas being used, and ten out of ten slots being downlink slots, a peak throughput (assuming a peak bandwidth envelope) may be a first value (e.g., 4 Gbps). With a single CC and six antennas (assuming a peak bandwidth envelope), the peak throughput may be a second value (e.g., 3 Gbps). With 0.7 CCs and 8 antennas (assuming a peak bandwidth envelope), a peak throughput may be a third value (e.g., 2.8 Gbps).

In some examples, a UE may not be capable of using six or eight antennas for a given slot after a slot in which only four antennas were used. For example, in the first case 225-b, there is no slot offset or SDL mode. A throughput of 3.2 Gbps may be calculated based on eight of the ten slots being downlink slots (thereby having a peak throughput of 4 Gbps, reduced by the quantity of such slots relative to the total amount of slots for the peak throughput). This may be expressed by the equation Tput_case1=8/10*Tput_4ant, where Tput_4ant=4 Gbps. In some examples in which static capability reporting is employed (e.g., where antennas are not recycled or reassigned flexibly) and the UE is not capable of using six or eight antennas for a given slot after a slot in which only four antennas were used, the throughput may be limited for the D+U slots (e.g., slot 3 and slot 4) for the first case 225-a.

However, in the second case 230-b, an SDL mode may be employed. A throughput of 3.6 Gbps may be calculated for the second case 230-b based on six of the ten slots being downlink slots that use both CC1 and CC2 (and thereby having a peak throughput of 4 Gbps, reduced by the quantity of such slots relative to the total amount of slots used for the peak throughput calculation) and two of the five possible slots (due to the use of a single CC) being downlink slots that use either CC1 or CC2 (thereby having a peak throughput of 3 Gbps, also reduced by the quantity of such slots relative to the total amount of slots used for the peak throughput calculation). This may be expressed by the equation Tput_case2=6/10 Tput_4ant+2/5 Tput_6ant, where Tput_4ant=4 Gbps and Tput_6ant=3 Gbps, which gives Tput_case2=3.6 Gbps. Thus, by including using an SDL mode, flexible antenna assignments, or both, throughput may be increased.

FIG. 3 shows an example of a wireless communications system 300 that supports antenna recycling for carrier aggregation in accordance with one or more examples as disclosed herein. The wireless communications system 300 may include a network entity 105-a that may be an example of the one or more of the network entities 105 discussed in relation to FIG. 1. The wireless communications system 300 may include UE 115-a that may be an example of UE 115 discussed in relation to FIG. 1. In some examples, the UE 115-a may be located in a geographic coverage area 110-a that may be associated with the network entity 105-a. The network entity 105-a and UE 115-a may communicate via one or more downlink communication links 305-a and one or more uplink communication links 305-b.

As described herein, flexibly distributing antennas 345 across different CCs may improve throughput of a downlink transmission 325 or multiple downlink transmissions 325. Thus, a UE may flexibly distribute assignments of the antennas 345 (which may correspond to a quantity of MIMO layers or may be different than (e.g., greater than) the quantity of MIMO layers) across different CCs, such as CC1 and CC2. Such operations may be supported as a UE capability. For example, the UE 115-a may report (e.g., via the UE capability indication 330, which may include or be associated with one or more information elements, such as UECapabilityInformation) a total quantity 350 (e.g., a maximum quantity) of supported antennas 345, a quantity of MIMO layers, or both, for a given band combination. For example, and similar to other examples described herein, the UE 115-a may report eight as a quantity of antennas 345 (e.g., for T+T carrier aggregation (CA), such as in a B1-B2 band combination for inter-band carrier aggregation). In some examples, the UE 115-a may report additional information about UE capabilities, including one or more band combinations (e.g., via one or more information elements, such as supportedBandCombinationList or other elements), one or more band parameters (e.g., via one or more information elements, such as BandParameters or other elements), one or more feature set combinations (e.g., via one or more information elements, such as featureSetCombinations or other elements), one or more feature sets (e.g., via one or more information elements, such as featureSets or other elements). In some examples, the UE 115-a may transmit one or more indications of features supported by the UE via one or more information elements, such as Feature-SetDownlinkPerCC, FeatureSetUplinkPerCC, or one or more other information elements that may indicate features for a plurality of CCs (e.g., the quantity of antennas that the UE may be capable of using, as described herein). Such information may be included in or transmitted in association with the UE capability indication 330 or may be transmitted separately.

In some examples, the capability of the UE to distribute assignments of the antennas 345 across the multiple CCs (e.g., CC1 and CC2) may be dependent on whether one or more frequency bands, one or more band combinations, one or more frequency ranges, or any combination thereof, support the capability of the UE. For example, the UE 115-a may be permitted to enable the capability to distribute assignments of the antennas 345 across the multiple CCs in or across some frequency bands, band combinations, or frequency ranges and may not be permitted to do so in or across other frequency bands, band combinations, or frequency ranges. As another example, the UE may be permitted to employ the capability in some frequency ranges, such as FR1 or FR2, but may not be permitted to employ the capability across the different frequency ranges. For example, the UE 115-a may not be permitted to distribute antenna assignments in both FR1 and FR2 (e.g., due to architecture differences between FR1 and FR2). In some examples, one or more rules or operations may be employed to distribute assignments of the antennas 345 in a quantity of slots across CCs (e.g., CC1 and CC2). For example, the UE 115-a may report (e.g., in the UE capability indication 330) that a quantity of antennas 345 to be assigned across CC1 and CC2 for downlink communications may be less than or equal to a quantity X, such as the total quantity 350. This quantity may be respected in some slots or all slots regardless of the direction of the slot on different CCs. Additionally, or alternatively, besides a total value, the UE 115-*a* may also set a quantity or limit (e.g., by indicating a per-CC quantity 355) on the quantity of antennas 345 for one or more individual CCs. For example, the UE 115-*a* may indicate in the UE capability indication 330 the total quantity 350 (e.g., eight antennas 345) and a per-CC quantity 355 (e.g., four antennas 345) as a per-CC quantity or limit.

In some examples, the total quantity 350, the per-CC quantity 355, or both could also be dependent on the collective bandwidth 340 (e.g., a downlink bandwidth across CCs, such as CC1 and CC2), the bandwidth 335-*a* (e.g., an individual bandwidth associated with CC1), the bandwidth 335-*b*. (e.g., an individual bandwidth associated with CC2), or any combination thereof. The use of a per-CC bandwidth, such as bandwidth 335-*a* or bandwidth 335-*b*, may be used to account for a super-linear decrease of envelope bandwidth that may occur as a function of a quantity of antennas 345, a quantity of MIMO layers, or both.

In some examples, a bandwidth (e.g., the collective bandwidth 340, the bandwidth 335-*a*, the bandwidth 335-*b*, or any combination thereof) may be a bandwidth of a CC, an active downlink bandwidth part bandwidth, a bandwidth of an actual (e.g., scheduled) data channel, or any combination thereof. For example, the UE 115-*a* may report that if a scheduled bandwidth is less than, equal to, or less than or equal to an indicated quantity, the UE may support up to eight antennas 345 on a CC, whereas if the bandwidth is greater than, equal to, or greater than or equal to the indicated quantity, the UE 115-*a* may only support six antennas 345.

Additionally, or alternatively, in some examples, supporting the use of the total quantity 350, the per-CC quantity 355, the bandwidth-based determinations, or any combination thereof, may depend or be based on one or more bands, one or more band combinations, one or more duplexing operations or configurations, one or more frequency ranges, or any combination thereof.

In some examples, the UE 115-*a* may support semi-static antenna assignment or mapping, dynamic antenna assignment or mapping, or any combination thereof. Support of such schemes by the UE 115-*a* may be described as separate or combined capabilities. However, in some examples, if the UE 115-*a* supports dynamic switching, it could be assumed that the UE 115-*a* also supports semi-static switching.

In a semi-static antenna switching scenario, the UE 115-*a* may be configured to support a per-CC quantity 355 of antennas 345, layers, or both per CC (e.g., while still considering the limits or quantities mentioned herein, including the total quantity 350, the per-CC quantity 355, one or more quantities of layers (be they the same or different than a quantity of antennas), bandwidth-based determinations, one or more other operations or elements, or any combination thereof). For example, in case of a D+U slot across CC1 and CC2, an antenna assignment may be 6+0 (e.g., which may involve a quantity of six layers or less), whereas in a U+D slots, an antenna assignment may be 0+8 (e.g., which may involve a quantity of eight layers or less). Further, in a D+D or D+S slot, the antenna assignment may be 4+4 (e.g., which may involve a quantity of eight layers or less). In some examples, N symbols or flexible symbols can be configured to be assumed U or D for the purpose of antenna assignments. In some examples, the configuration may take different forms across times (e.g., depending on the slot/symbol directions on each CC).

Additionally, or alternatively, slow modification of antenna 345 distribution across CCs (e.g., without relying on actual scheduled channels) may include indicating the total quantity 350, the per-CC quantity 355 of antennas 345 per CC, or both, (optionally expressed per unit of time, such as over different slots/symbols) using the control signaling 320 (e.g., MAC-CE or DCI signaling) that may not schedule data (e.g., a MAC-CE or DCI transmission or message dedicated to such indications). In some examples, the distribution of assignments may be assumed to be as indicated until modified again (e.g., by subsequent control signaling).

In some examples, the network entity 105-*a* may request (e.g., via control signaling 320 or other signaling) UE capability information (e.g., by transmitting an information element such as UECapabilityEnquiry). In some examples, the UE 115-*a* may respond with the UE capability indication 330 (which may include an information element, such as UECapabilityInformation) based on receiving the request from the network entity 105-*a*.

In some examples, the UE 115-*a* may employ dynamic antenna 345 switching in which, in accordance with the capabilities and quantities described herein, the UE 115-*a* determines the actual channels that are granted or configured for transmission on DL and UL across CCs (e.g., CC1 and CC2). For example, in a D+D slot across two CC1 and CC2, the UE 115-*a* may employ an antenna assignment of 8+0 or 4+4 or 0+8 (e.g., which may involve a quantity of eight layers or less). In some examples, the determination of which antenna assignment pattern or configuration to use may depend on whether the downlink transmissions 325 are scheduled on two CCs or on one CC only. For example, in a D+S slot (assuming S contains only flexible symbols), a UE may employ an antenna assignment of 8+0 if nothing is scheduled on the second carrier or if an uplink transmission is scheduled. Additionally, or alternatively, the UE 115-*a* may employ an antenna assignment of 4+4 (e.g., which may involve a quantity of eight layers or less) if both are scheduled with downlink transmissions 325.

In some examples, to support dynamic switching, a switching time may not be used. However, for ease of implementation in some cases, a switching time may be specified (e.g., in control information, such as DCI signaling). Such a switching time may be defined as a gap between a downlink control channel transmission (e.g., a PDCCH transmission) and a downlink shared channel transmission (e.g., a PDSCH transmission) or may be defined as an extra time for downlink shared channel transmission (e.g., PDSCH transmission) processing (e.g., a gap between a downlink shared channel transmission and an uplink control channel transmission (e.g., a PUCCH transmission)), such as for HARQ feedback transmission.

In those scheduling cases that may not be consistent or may not support the switching gap may be considered as error events or, if allowed, the grants may be specified to be consistent with the per-CC quantity 355. For example, in a T+T CA scenario and in a D+D slot, if the switching gap (e.g., between PDCCH and PDSCH) is violated, the grants may specify an antenna assignment of 4+4 (e.g., as a maximum quantity, either per-CC or across all CCs) and other antenna assignment distributions (e.g., such as 8+0) may not be supported by UE 115-*a*.

In some examples, (e.g., in addition to the reporting of UE capabilities, such as the UE capability indication 330) the UE 115-*a* may report one or more preferences associated with the antenna assignment scheme. For example, the UE 115-*a* may report (e.g., in the UE preference information 360) a selected antenna assignment distribution across CCs, bands, or both, as UE assistance information to the network. In some examples, instead of transmitting UE assistance information (e.g., a request), the UE 115-*a* may select an antenna assignment scheme or distribution, and the network entity 105-*a* may operate in accordance with the antenna assignment scheme or distribution.

In some examples, the operations and features described herein may be applied to a scenario in which the UE 115-*a* is configured with a larger quantity of CCs than the UE 115-*a* is capable of using. For example, suppose that the UE 115-*a* can support DL CA over two CCs, but is configured with four CCs. Thus, at a given time, the UE 115-*a* may not be scheduled for downlink communications over more than 2 CCs and the distribution of antenna assignments in such a case may follow the same operations or principles as described herein over any or all of the two CCs that could be scheduled simultaneously.

As described in relation to FIG. 2, modifying scheduling over one or more CCs for only downlink communications or to have a complementary slot format pattern with other cells may improve throughput of communications. In some examples, the UE 115-*a* may request (e.g., in the UE preference information 360) one or more such slot format patterns (e.g., downlink only patterns or complementary slot format patterns), which may improve throughput of communications with the UE 115-*a*.

FIG. 4 shows examples of assignment schemes that support antenna recycling for carrier aggregation in accordance with one or more examples as disclosed herein.

The assignment scheme 401 may depict a situation in which the distribution of assignments of the antennas 345 may be fully flexible across CC1 and CC2. For example, any or all of the antennas 345 may be assigned to CC1 or CC2, and any combination of assignments of the antennas 345 across CC1 and CC2 may be employed.

However, assignment scheme 402 may depict a situation in which the distribution of assignments of the antennas 345 may be limited. For example, the distribution could be flexible only from CC1 to CC2, resulting in possible assignments of 8+0 or 4+4 (e.g., which may involve a quantity of eight layers or less). Additionally, or alternatively, a distribution of the antennas 345 may include that a group of antennas 345 (e.g., the group 420-*a*, the group 420-*b*, or both) may be limited to one or more CCs (e.g., a subset of CCs of the total quantity of available CCs). For example, the antennas 345 of group 420-*a* may be freely assignable to CC1 or CC2, but the antennas 345 of group 420-*b* may only be assignable to CC2. In another example, if the UE 115-*a* is configured with three downlink CCs and has eight antennas available, CC1 may have a limit of two antennas that may not be reassigned to another CC. In such a case, the remaining six antennas may be shared (e.g., may be freely assignable) across the other two CCs. In some examples, the total quantity of CCs over which the UE 115-*a* may operate (whether or not the distribution of the antennas 345 utilizes some CCs or not) may be CCs in one or more given bands, one or more given band combinations, or any combination thereof.

Assignment scheme 403 depicts yet other possible situations or distributions of antenna assignments in which some configurations or distributions 425 are allowed and all others are not allowed. In such cases, the UE 115-*a*, the network entity 105-*a*, or both, may select from the available distributions 425 for use in communications. For example, the distribution 425-*a* may include eight antennas assigned to CC1 and zero antennas assigned to CC2. The distribution 425-*b* may include six antennas assigned to CC1 and two antennas assigned to CC2. The distribution 425-*c* may include four antennas assigned to CC1 and four antennas assigned to CC2. Given these options, the UE 115-*a*, the network entity 105-*a*, or both, may select one of the distribution 425-*a*, distribution 425-*b*, or distribution 425-*c* for use in downlink communications, and other distributions may not be allowed. Though these example distributions are shown, other distributions may be employed, and any quantity of antennas may be distributed across any quantity of CCs (both for the assignment scheme 403 as well as other situations or operations described herein). Further, any or all of the antennas distributions or configurations described herein may be associated with a quantity of layers (e.g., a maximum quantity of layers) or with multiple quantities of layers (e.g., some or all of which may be maximum quantities of layers).

Figure 5:
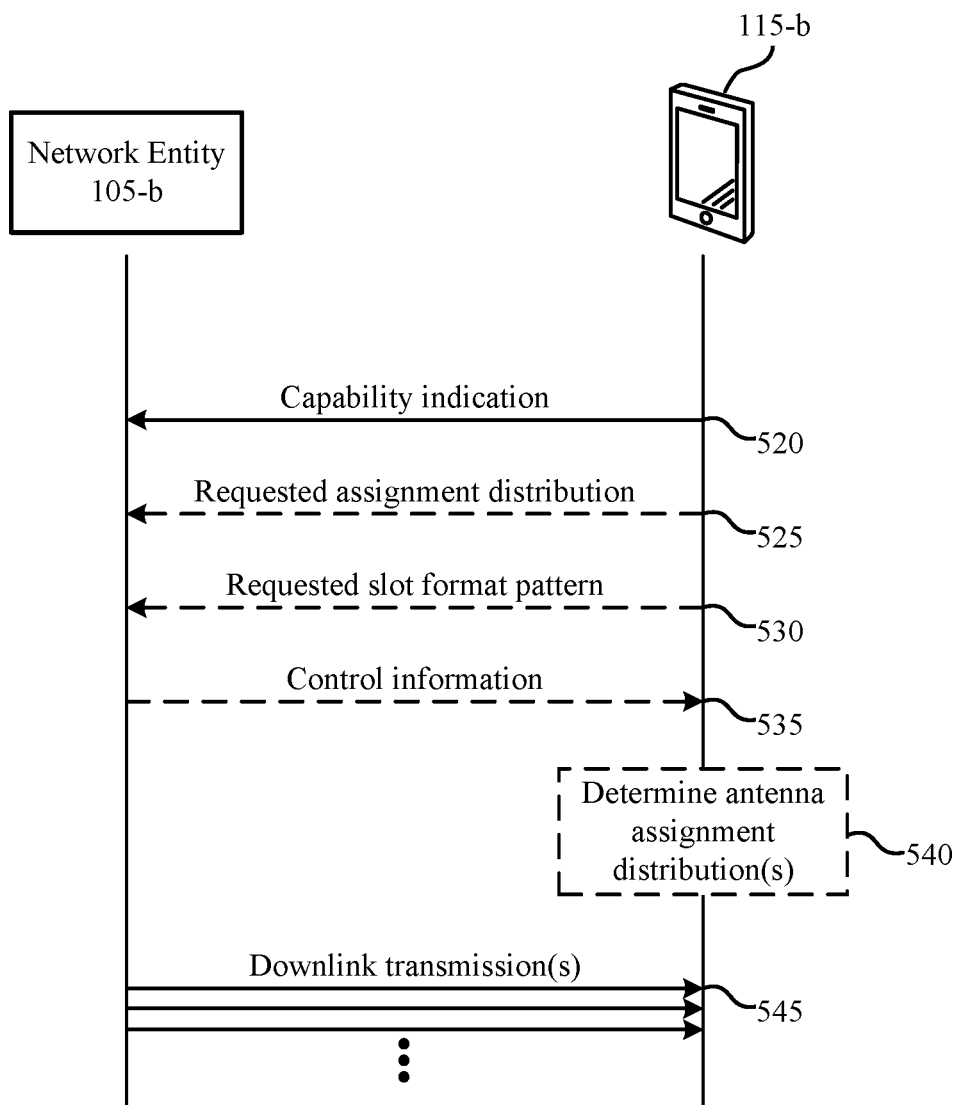
FIG. 5 shows an example of a process flow that supports antenna recycling for carrier aggregation in accordance with one or more examples as disclosed herein.

FIG. 5 shows an example of a process flow 500 that supports antenna recycling for carrier aggregation in accordance with one or more examples as disclosed herein. The process flow 500 may implement various aspects of the present disclosure described herein. The elements described in the process flow 500 (e.g., UE 115-*b* and network entity 105-*b*) may be examples of similarly named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the UE 115-*b* may transmit an indication of a capability of the UE 115-*b* to receive downlink transmissions over a plurality of component carriers with a first quantity of antennas. In some examples, the capability of the UE 115-*b* may further indicate a second quantity of antennas with which the UE 115-*b* is capable of receiving downlink transmissions over a single component carrier of the plurality of component carriers. In some examples, the second quantity of antennas is based on a bandwidth associated with the single component carrier. In some examples, the bandwidth associated with the single component carrier is a downlink component carrier bandwidth, an active downlink bandwidth part bandwidth, or a bandwidth of a downlink data channel. In some examples, the second quantity of antennas is based on a bandwidth associated with the plurality of component carriers. In some examples, the bandwidth associated with the plurality of component carriers is a downlink component carrier bandwidth, an active downlink bandwidth part bandwidth, or a bandwidth of a downlink data channel. In some examples, the capability of the UE 115-*b* may further indicate one or more distributions of assignments of the first quantity of antennas across the plurality of component carriers. In some examples, the capability of the UE 115-*b* may further indicate one or more antennas of the first quantity of antennas that are permitted to receive the downlink transmissions only on a subset of the plurality of component carriers. In some examples, the capability of the UE 115-*b* may further indicate that any of the first quantity of antennas are permitted to receive the downlink transmissions on any of the plurality of component carriers. As described herein, the UE 115-*b* may communicate using multiple MIMO layers and the quantity of MIMO layers used or configured may be different than a quantity of antennas associated with the antenna assignment distribution.

At 525, the UE 115-*b* may transmit a requested distribution of assignments of the first quantity of antennas across at least the subset of the plurality of component carriers and receiving the downlink transmissions may include receiving the downlink transmissions in accordance with the requested distribution of assignments of the first quantity of antennas.

At 530, the UE 115-*b* may transmit an indication of a requested slot format pattern for communications.

At 535, the UE 115-*b* may receive control information scheduling the downlink transmissions over the subset of the plurality of component carriers based on transmitting the indication. In some examples, the control information specifies one or more durations for switching antennas following at least one downlink transmission of the downlink transmissions. In some examples, the one or more durations are defined as time periods for processing the downlink transmissions. Additionally, or alternatively, the UE 115-*b* may receive control information that may indicate a plurality of slot formats for a plurality of slots associated with one or more component carriers of the plurality of component carriers based on transmitting the indication. Such slot formats may include designations of uplink slots, downlink slots, sidelink slots, flexible slots, or any combination thereof for the one or more component carriers of the plurality of component carriers. Additionally, or alternatively, the UE 115-*b* may receive control information that may indicate one or more maximum quantities of antennas with which the UE 115-*b* is to receive the downlink transmissions over respective component carriers of the plurality of component carriers based on transmitting the indication. Additionally, or alternatively, the UE 115-*b* may receive, in accordance with the capability of the UE 115-*b*, control information scheduling transmission of the downlink transmissions over at least the subset of the plurality of component carriers.

At 540, the UE 115-*b* may determine, based on the control information, a distribution of assignments of the first quantity of antennas across the one or more component carriers and receiving the downlink transmissions is in accordance with the distribution of assignments of the first quantity of antennas, where the distribution of assignments comprises assignment of different quantities of antennas to different downlink time periods in the one or more component carriers. Additionally, or alternatively, the UE 115-*b* may determine, based on the plurality of slot formats, a distribution of assignments of the first quantity of antennas across the one or more component carriers for the plurality of slots and receiving the downlink transmissions is in accordance with the distribution of assignments of the first quantity of antennas, where the distribution of assignments comprises assignment of different quantities of antennas to different downlink time periods in the one or more component carriers. Additionally, or alternatively, the UE 115-*b* may determine, based on the one or more maximum quantities, a distribution of assignments of the first quantity of antennas across the respective component carriers and receiving the downlink transmissions is in accordance with the distribution of assignments of the first quantity of antennas, where the distribution of assignments comprises assignment of different quantities of antennas to different downlink time periods in the one or more component carriers.

At 545, the UE 115-*b* may receive, in accordance with the indication of the capability of the UE 115-*b*, the downlink transmissions with at least a subset of the first quantity of antennas and over at least a subset of the plurality of component carriers. In some examples, receiving the downlink transmissions may include receiving the downlink transmissions in accordance with the second quantity of antennas. In some examples, receiving the downlink transmissions may include receiving the downlink transmissions in accordance with the requested slot format pattern.

Figure 6:
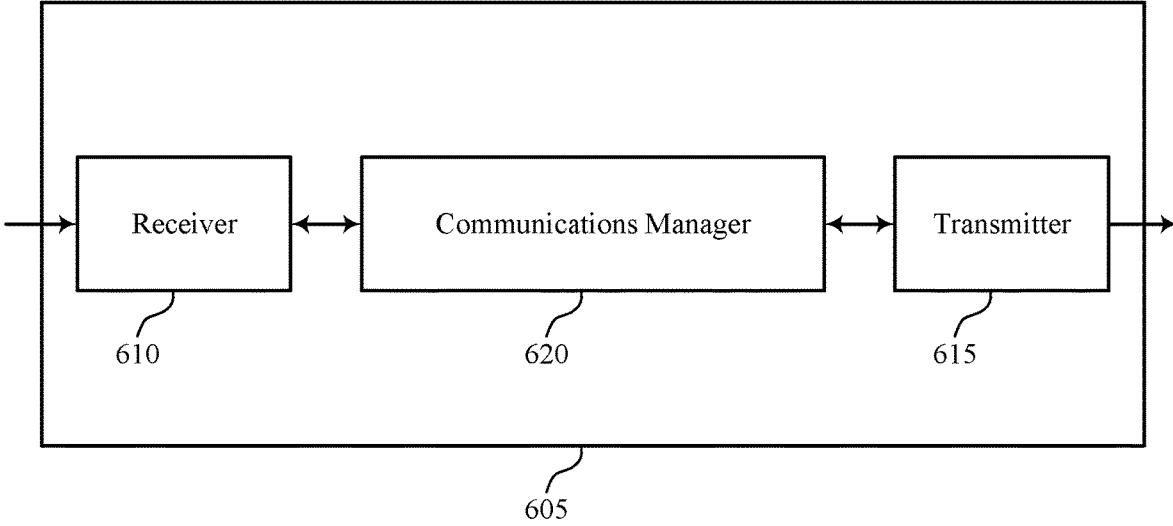
FIGS. 6 and 7 show block diagrams of devices that support antenna recycling for carrier aggregation in accordance with one or more examples as disclosed herein.

FIG. 6 shows a block diagram 600 of a device 605 that supports antenna recycling for carrier aggregation in accordance with one or more examples as disclosed herein. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to antenna recycling for carrier aggregation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to antenna recycling for carrier aggregation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of antenna recycling for carrier aggregation as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

Additionally, or alternatively, the communications manager 620 may support wireless communications in accordance with examples as disclosed herein. For example, the communications manager 620 is capable of, configured to, or operable to support a means for transmitting an indication of a capability of the UE to receive downlink transmissions over a set of multiple component carriers with a first quantity of antennas. The communications manager 620 is capable of, configured to, or operable to support a means for receiving, in accordance with the indication of the capability of the UE, the downlink transmissions with at least a subset of the first quantity of antennas and over at least a subset of the plurality of component carriers.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for distributing receive antennas across different CCs and thereby help a UE achieve a higher data throughput.

Figure 7:
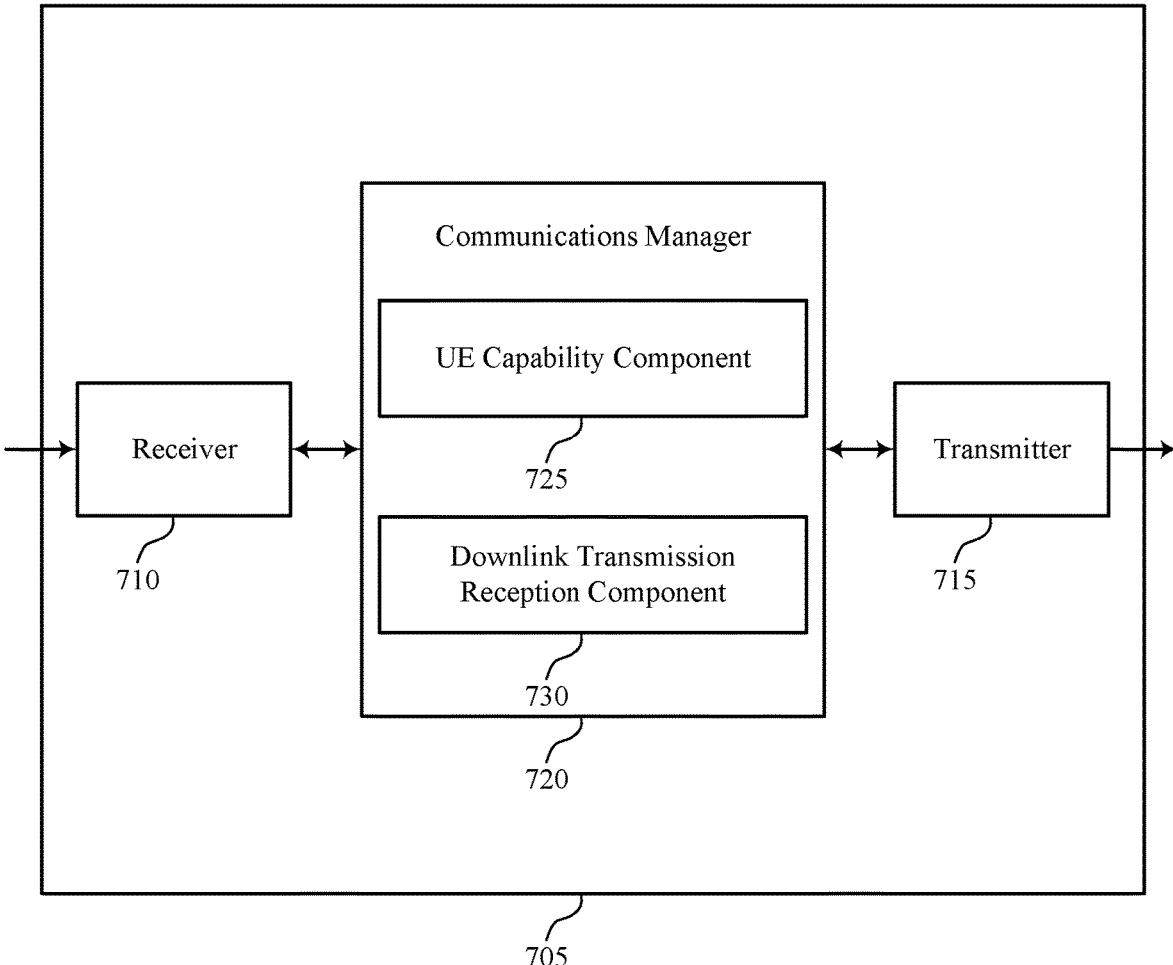
Figure 7:

FIG. 7 shows a block diagram 700 of a device 705 that supports antenna recycling for carrier aggregation in accordance with one or more examples as disclosed herein. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to antenna recycling for carrier aggregation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to antenna recycling for carrier aggregation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of antenna recycling for carrier aggregation as described herein. For example, the communications manager 720 may include a UE capability component 725 a downlink transmission reception component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The UE capability component 725 is capable of, configured to, or operable to support a means for transmitting an indication of a capability of the UE to receive downlink transmissions over a set of multiple component carriers with a first quantity of antennas. The downlink transmission reception component 730 is capable of, configured to, or operable to support a means for receiving, in accordance with the indication of the capability of the UE, the downlink transmissions with at least a subset of the first quantity of antennas and over at least a subset of the plurality of component carriers.

Figure 8:
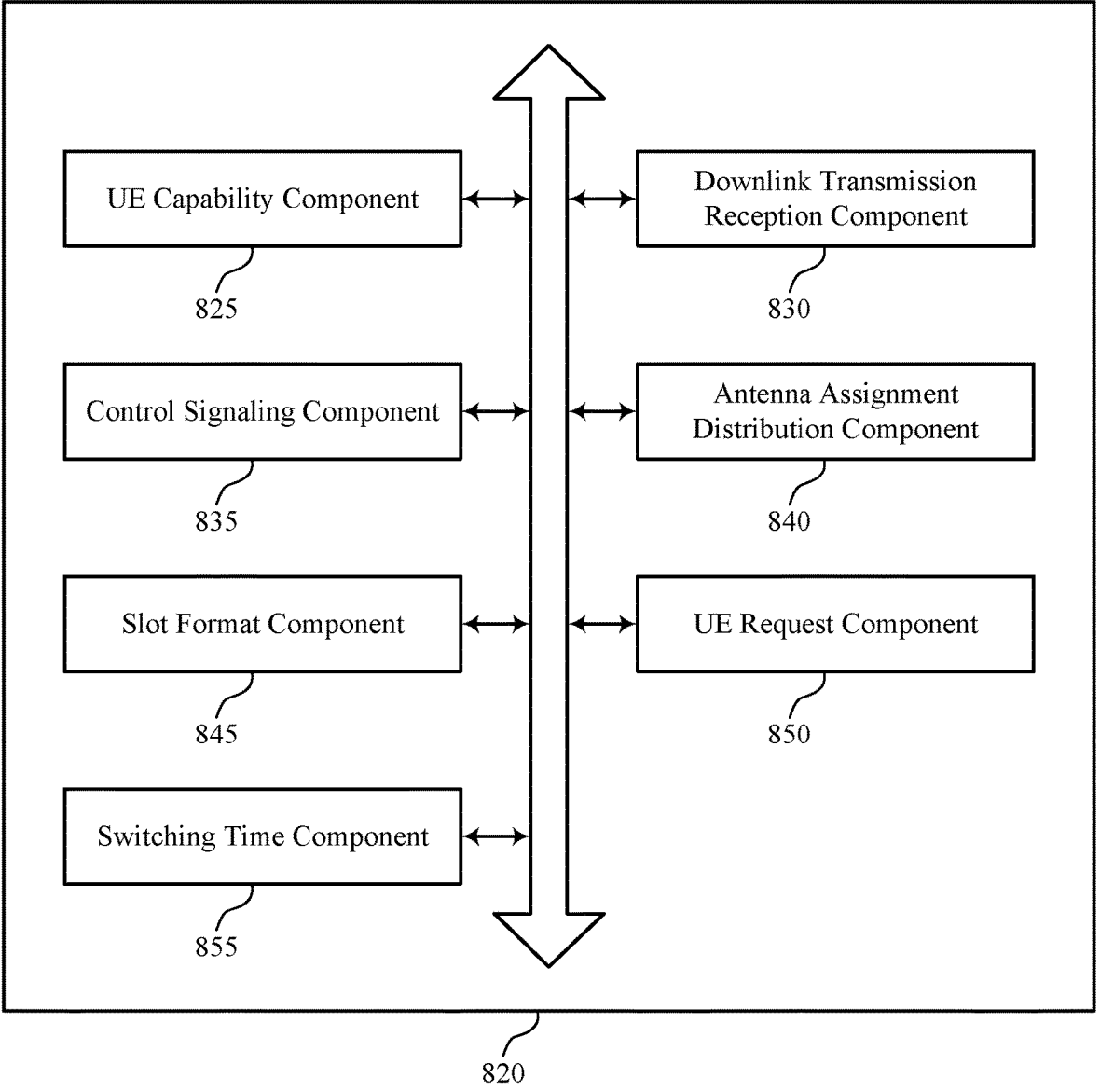
FIG. 8 shows a block diagram of a communications manager that supports antenna recycling for carrier aggregation in accordance with one or more examples as disclosed herein.

FIG. 8 shows a block diagram 800 of a communications manager 820 that supports antenna recycling for carrier aggregation in accordance with one or more examples as disclosed herein. The communications manager 820 may be an example of aspects of a communications manager 620, a communications manager 720, or both, as described herein. The communications manager 820, or various components thereof, may be an example of means for performing various aspects of antenna recycling for carrier aggregation as described herein. For example, the communications manager 820 may include a UE capability component 825, a downlink transmission reception component 830, a control signaling component 835, an antenna assignment distribution component 840, a slot format component 845, a UE request component 850, a switching time component 855, or any combination thereof. Each of these components, or components or subcomponents thereof (e.g., one or more processors, one or more memories), may communicate, directly or indirectly, with one another (e.g., via one or more buses).

Additionally, or alternatively, the communications manager 820 may support wireless communications in accordance with examples as disclosed herein. The UE capability component 825 is capable of, configured to, or operable to support a means for transmitting an indication of a capability of the UE to receive downlink transmissions over a set of multiple component carriers with a first quantity of antennas. The downlink transmission reception component 830 is capable of, configured to, or operable to support a means for receiving, in accordance with the indication of the capability of the UE, the downlink transmissions with at least a subset of the first quantity of antennas and over at least a subset of the plurality of component carriers.

In some examples, the control signaling component 835 is capable of, configured to, or operable to support a means for receiving control information scheduling the downlink transmissions over the subset of the plurality of component carriers based on transmitting the indication. In some examples, the antenna assignment distribution component 840 is capable of, configured to, or operable to support a means for determining, based on the control information, a distribution of assignments of the first quantity of antennas across the one or more component carriers, where receiving the downlink transmissions is in accordance with the distribution of assignments of the first quantity of antennas, where the distribution of assignments comprises assignment of different quantities of antennas to different downlink time periods in the one or more component carriers.

In some examples, the control information specifies one or more durations for switching antennas following at least one downlink transmission of the downlink transmissions. In some examples, the one or more durations are defined as time periods for processing the downlink transmissions.

In some examples, the slot format component 845 is capable of, configured to, or operable to support a means for receiving control information indicating a set of multiple slot formats for a set of multiple slots associated with one or more component carriers of the plurality of component carriers based on transmitting the indication. In some examples, the antenna assignment distribution component 840 is capable of, configured to, or operable to support a means for determining, based on the set of multiple slot formats, a distribution of assignments of the first quantity of antennas across the one or more component carriers for the set of multiple slots, where receiving the downlink transmissions is in accordance with the distribution of assignments of the first quantity of antennas, where the distribution of assignments comprises assignment of different quantities of antennas to different downlink time periods in the one or more component carriers.

In some examples, the control signaling component 835 is capable of, configured to, or operable to support a means for receiving control information indicating one or more maximum quantities of antennas with which the UE is to receive the downlink transmissions over respective component carriers of the plurality of component carriers based on transmitting the indication. In some examples, the antenna assignment distribution component 840 is capable of, configured to, or operable to support a means for determining, based on the one or more maximum quantities, a distribution of assignments of the first quantity of antennas across the respective component carriers, where receiving the downlink transmissions is in accordance with the distribution of assignments of the first quantity of antennas, where the distribution of assignments comprises assignment of different quantities of antennas to different downlink time periods in the one or more component carriers.

In some examples, the capability of the UE further indicates a second quantity of antennas with which the UE is capable of receiving downlink transmissions over a single component carrier of the plurality of component carriers. In some examples, receiving the downlink transmissions includes receiving the downlink transmissions in accordance with the second quantity of antennas.

In some examples, the second quantity of antennas is based on a bandwidth associated with the single component carrier.

In some examples, the bandwidth associated with the single component carrier is a downlink component carrier bandwidth, an active downlink bandwidth part bandwidth, or a bandwidth of a downlink data channel.

In some examples, the first quantity of antennas is based on a bandwidth associated with the plurality of component carriers.

In some examples, the bandwidth associated with the plurality of component carriers is a downlink component carrier bandwidth, an active downlink bandwidth part bandwidth, or a bandwidth of a downlink data channel.

In some examples, the capability of the UE further indicates one or more distributions of assignments of the first quantity of antennas across the plurality of component carriers.

In some examples, the capability of the UE further indicates one or more antennas of the first quantity of antennas that are permitted to receive the downlink transmissions only on a subset of the plurality of component carriers.

In some examples, the capability of the UE further indicates that any of the first quantity of antennas are permitted to receive the downlink transmissions on any of the plurality of component carriers.

In some examples, the UE request component 850 is capable of, configured to, or operable to support a means for transmitting a requested distribution of assignments of the first quantity of antennas across at least the subset of the plurality of component carriers, where receiving the downlink transmissions includes receiving the downlink transmissions in accordance with the requested distribution of assignments of the first quantity of antennas.

In some examples, the control signaling component 835 is capable of, configured to, or operable to support a means for receiving, in accordance with the capability of the UE, control information scheduling transmission of the downlink transmissions over at least the subset of the plurality of component carriers.

In some examples, the UE request component 850 is capable of, configured to, or operable to support a means for transmitting an indication of a requested slot format pattern for communications, where receiving the downlink transmissions includes receiving the downlink transmissions in accordance with the requested slot format pattern.

In some examples, the capability of the UE includes a capability to receive the downlink transmissions over a quantity of communications layers that is different than the first quantity of antennas.

In some examples, the capability of the UE is enabled based on the downlink transmissions being scheduled in one or more frequency bands that support the capability of the UE, one or more band combinations that support the capability of the UE, one or more frequency ranges that support the capability of the UE, or any combination thereof.

Figure 9:
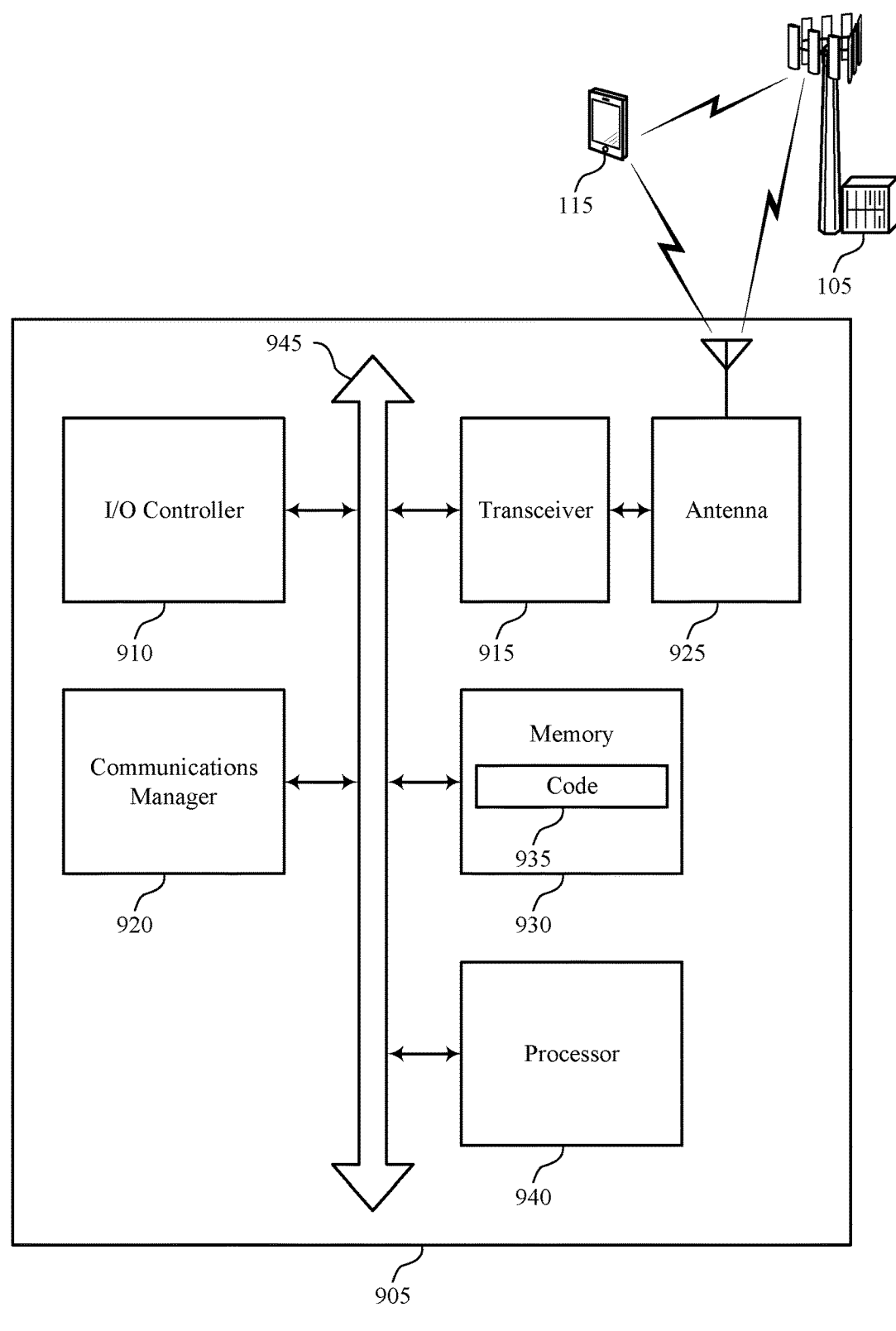
FIG. 9 shows a diagram of a system including a device that supports antenna recycling for carrier aggregation in accordance with one or more examples as disclosed herein.

FIG. 9 shows a diagram of a system 900 including a device 905 that supports antenna recycling for carrier aggregation in accordance with one or more examples as disclosed herein. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting antenna recycling for carrier aggregation). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

Additionally, or alternatively, the communications manager 920 may support wireless communications in accordance with examples as disclosed herein. For example, the communications manager 920 is capable of, configured to, or operable to support a means for transmitting an indication of a capability of the UE to receive downlink transmissions over a set of multiple component carriers with a first quantity of antennas. The communications manager 920 is capable of, configured to, or operable to support a means for receiving, in accordance with the indication of the capability of the UE, the downlink transmissions with at least a subset of the first quantity of antennas and over at least a subset of the plurality of component carriers.

By including or configuring the communications manager 920 in accordance with examples as described herein, the device 905 may support techniques for distributing receive antennas across difference CCs to thereby help the device 905 achieve a higher throughput.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of antenna recycling for carrier aggregation as described herein, or the at least one processor

940 and the at least one memory 930 may be otherwise configured to, individually or collectively, perform or support such operations.

FIG. 10 shows a flowchart illustrating a method 1000 that supports antenna recycling for carrier aggregation in accordance with examples as disclosed herein. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include transmitting an indication of a capability of the UE to receive downlink transmissions over a set of multiple component carriers with a first quantity of antennas. The operations of block 1005 may be performed in accordance with examples as disclosed herein. In some examples, aspects of the operations of 1005 may be performed by a UE capability component 825 as described with reference to FIG. 8.

At 1010, the method may include receiving, in accordance with the indication of the capability of the UE, the downlink transmissions with at least a subset of the first quantity of antennas and over at least a subset of the plurality of component carriers. The operations of block 1010 may be performed in accordance with examples as disclosed herein. In some examples, aspects of the operations of 1010 may be performed by a downlink transmission reception component 830 as described with reference to FIG. 8.

FIG. 11 shows a flowchart illustrating a method 1100 that supports antenna recycling for carrier aggregation in accordance with examples as disclosed herein. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include transmitting an indication of a capability of the UE to receive downlink transmissions over a set of multiple component carriers with a first quantity of antennas. The operations of block 1105 may be performed in accordance with examples as disclosed herein. In some examples, aspects of the operations of 1105 may be performed by a UE capability component 825 as described with reference to FIG. 8.

At 1110, the method may include receiving control information scheduling the downlink transmissions over the subset of the plurality of component carriers based on transmitting the indication. The operations of block 1110 may be performed in accordance with examples as disclosed herein. In some examples, aspects of the operations of 1110 may be performed by a control signaling component 835 as described with reference to FIG. 8.

At 1115, the method may include determining, based on the control information, a distribution of assignments of the first quantity of antennas across the one or more component carriers, where receiving the downlink transmissions is in accordance with the distribution of assignments of the first quantity of antennas, where the distribution of assignments comprises assignment of different quantities of antennas to different downlink time periods in the one or more component carriers. The operations of block 1115 may be performed in accordance with examples as disclosed herein. In some examples, aspects of the operations of 1115 may be performed by an antenna assignment distribution component 840 as described with reference to FIG. 8.

At 1120, the method may include receiving, in accordance with the indication of the capability of the UE, the downlink transmissions with at least a subset of the first quantity of antennas and over at least a subset of the plurality of component carriers. The operations of block 1120 may be performed in accordance with examples as disclosed herein. In some examples, aspects of the operations of 1120 may be performed by a downlink transmission reception component 830 as described with reference to FIG. 8.

FIG. 12 shows a flowchart illustrating a method 1200 that supports antenna recycling for carrier aggregation in accordance with examples as disclosed herein. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include transmitting an indication of a capability of the UE to receive downlink transmissions over a set of multiple component carriers with a first quantity of antennas. The operations of block 1205 may be performed in accordance with examples as disclosed herein. In some examples, aspects of the operations of 1205 may be performed by a UE capability component 825 as described with reference to FIG. 8.

At 1210, the method may include receiving control information indicating a set of multiple slot formats for a set of multiple slots associated with one or more component carriers of the plurality of component carriers based on transmitting the indication. The operations of block 1210 may be performed in accordance with examples as disclosed herein. In some examples, aspects of the operations of 1210 may be performed by a slot format component 845 as described with reference to FIG. 8.

At 1215, the method may include determining, based on the set of multiple slot formats, a distribution of assignments of the first quantity of antennas across the one or more component carriers for the set of multiple slots, where receiving the downlink transmissions is in accordance with the distribution of assignments of the first quantity of antennas, where the distribution of assignments comprises assignment of different quantities of antennas to different downlink time periods in the one or more component carriers. The operations of block 1215 may be performed in accordance with examples as disclosed herein. In some examples, aspects of the operations of 1215 may be performed by an antenna assignment distribution component 840 as described with reference to FIG. 8.

At 1220, the method may include receiving, in accordance with the indication of the capability of the UE, the downlink transmissions with at least a subset of the first quantity of antennas and over at least a subset of the plurality of component carriers. The operations of block 1220 may be performed in accordance with examples as disclosed herein. In some examples, aspects of the operations of 1220 may be performed by a downlink transmission reception component 830 as described with reference to FIG. 8.

FIG. 13 shows a flowchart illustrating a method 1300 that supports antenna recycling for carrier aggregation in accordance with examples as disclosed herein. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include transmitting an indication of a capability of the UE to receive downlink transmissions over a set of multiple component carriers with a first quantity of antennas. The operations of block 1305 may be performed in accordance with examples as disclosed herein. In some examples, aspects of the operations of 1305 may be performed by a UE capability component 825 as described with reference to FIG. 8.

At 1310, the method may include receiving control information indicating one or more maximum quantities of antennas with which the UE is to receive the downlink transmissions over respective component carriers of the plurality of component carriers based on transmitting the indication. The operations of block 1310 may be performed in accordance with examples as disclosed herein. In some examples, aspects of the operations of 1310 may be performed by a control signaling component 835 as described with reference to FIG. 8.

At 1315, the method may include determining, based on the one or more maximum quantities, a distribution of assignments of the first quantity of antennas across the respective component carriers, where receiving the downlink transmissions is in accordance with the distribution of assignments of the first quantity of antennas, where the distribution of assignments comprises assignment of different quantities of antennas to different downlink time periods in the one or more component carriers. The operations of block 1315 may be performed in accordance with examples as disclosed herein. In some examples, aspects of the operations of 1315 may be performed by an antenna assignment distribution component 840 as described with reference to FIG. 8.

At 1320, the method may include receiving, in accordance with the indication of the capability of the UE, the downlink transmissions with at least a subset of the first quantity of antennas and over at least a subset of the plurality of component carriers. The operations of block 1320 may be performed in accordance with examples as disclosed herein. In some examples, aspects of the operations of 1320 may be performed by a downlink transmission reception component 830 as described with reference to FIG. 8.

The following provides an overview of aspects of the present disclosure:

Aspect 1: A method for wireless communications at a UE, comprising: transmitting an indication of a capability of the UE to receive downlink transmissions over a plurality of component carriers with a first quantity of antennas; and receiving, in accordance with the indication of the capability of the UE, the downlink transmissions with at least a subset of the first quantity of antennas and over at least a subset of the plurality of component carriers.

Aspect 2: The method of aspect 1, further comprising: receiving control information scheduling the downlink transmissions over the subset of the plurality of component carriers based at least in part on transmitting the indication;

and determining, based at least in part on the control information, a distribution of assignments of the first quantity of antennas across the one or more component carriers, wherein receiving the downlink transmissions is in accordance with the distribution of assignments of the first quantity of antennas, where the distribution of assignments comprises assignment of different quantities of antennas to different downlink time periods in the one or more component carriers.

Aspect 3: The method of aspect 2, wherein the control information specifies one or more durations for switching antennas following at least one downlink transmission of the downlink transmissions; and the one or more durations are defined as time periods for processing the downlink transmissions.

Aspect 4: The method of any of aspects 1 through 3, further comprising: receiving control information indicating a plurality of slot formats for a plurality of slots associated with one or more component carriers of the plurality of component carriers based at least in part on transmitting the indication; and determining, based at least in part on the plurality of slot formats, a distribution of assignments of the first quantity of antennas across the one or more component carriers for the plurality of slots, wherein receiving the downlink transmissions is in accordance with the distribution of assignments of the first quantity of antennas, where the distribution of assignments comprises assignment of different quantities of antennas to different downlink time periods in the one or more component carriers.

Aspect 5: The method of any of aspects 1 through 4, further comprising: receiving control information indicating one or more maximum quantities of antennas with which the UE is to receive the downlink transmissions over respective component carriers of the plurality of component carriers based at least in part on transmitting the indication; and determining, based at least in part on the one or more maximum quantities, a distribution of assignments of the first quantity of antennas across the respective component carriers, wherein receiving the downlink transmissions is in accordance with the distribution of assignments of the first quantity of antennas, where the distribution of assignments comprises assignment of different quantities of antennas to different downlink time periods in the one or more component carriers.

Aspect 6: The method of any of aspects 1 through 5, wherein the capability of the UE further indicates a second quantity of antennas with which the UE is capable of receiving downlink transmissions over a single component carrier of the plurality of component carriers; and receiving the downlink transmissions comprises receiving the downlink transmissions in accordance with the second quantity of antennas.

Aspect 7: The method of aspect 6, wherein the second quantity of antennas is based at least in part on a bandwidth associated with the single component carrier.

Aspect 8: The method of aspect 7, wherein the bandwidth associated with the single component carrier is a downlink component carrier bandwidth, an active downlink bandwidth part bandwidth, or a bandwidth of a downlink data channel.

Aspect 9: The method of any of aspects 1 through 8, wherein the first quantity of antennas is based at least in part on a bandwidth associated with the plurality of component carriers.

Aspect 10: The method of aspect 9, wherein the bandwidth associated with the plurality of component carriers is a downlink component carrier bandwidth, an active downlink bandwidth part bandwidth, or a bandwidth of a downlink data channel.

Aspect 11: The method of any of aspects 1 through 10, wherein the capability of the UE further indicates one or more distributions of assignments of the first quantity of antennas across the plurality of component carriers.

Aspect 12: The method of any of aspects 1 through 11, wherein the capability of the UE further indicates one or more antennas of the first quantity of antennas that are permitted to receive the downlink transmissions only on a subset of the plurality of component carriers.

Aspect 13: The method of any of aspects 1 through 12, wherein the capability of the UE further indicates that any of the first quantity of antennas are permitted to receive the downlink transmissions on any of the plurality of component carriers.

Aspect 14: The method of any of aspects 1 through 13, further comprising: transmitting a requested distribution of assignments of the first quantity of antennas across at least the subset of the plurality of component carriers, wherein receiving the downlink transmissions comprises receiving the downlink transmissions in accordance with the requested distribution of assignments of the first quantity of antennas.

Aspect 15: The method of any of aspects 1 through 14, further comprising: receiving, in accordance with the capability of the UE, control information scheduling transmission of the downlink transmissions over at least the subset of the plurality of component carriers.

Aspect 16: The method of any of aspects 1 through 15, further comprising: transmitting an indication of a requested slot format pattern for communications, wherein receiving the downlink transmissions comprises receiving the downlink transmissions in accordance with the requested slot format pattern.

Aspect 17: The method of any of aspects 3 through 16, wherein the capability of the UE comprises a capability to receive the downlink transmissions over a quantity of communications layers that is different than the first quantity of antennas.

Aspect 18: The method of any of aspects 3 through 17, wherein the capability of the UE is enabled based at least in part on the downlink transmissions being scheduled in one or more frequency bands that support the capability of the UE, one or more band combinations that support the capability of the UE, one or more frequency ranges that support the capability of the UE, or any combination thereof.

Aspect 19: A UE for wireless communications, comprising one or more memories storing processor-executable code, and one or more processors coupled with the one or more memories and individually or collectively operable to execute the code to cause the UE to perform a method of any of aspects 1 through 16.

Aspect 20: A UE for wireless communications, comprising at least one means for performing a method of any of aspects 1 through 16.

Aspect 21: A non-transitory computer-readable medium storing code for wireless communications, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
transmit an indication of a capability of the UE to receive downlink transmissions over a plurality of component carriers with a first quantity of antennas;
receive control information scheduling the downlink transmissions over a subset of the plurality of component carriers based at least in part on transmitting the indication, wherein the control information specifies one or more durations for switching antennas following at least one downlink transmission of the downlink transmissions, and wherein the one or more durations are defined as time periods for processing the downlink transmissions; and
receive, in accordance with the indication of the capability of the UE, the downlink transmissions with at least the subset of the first quantity of antennas and over at least a subset of the plurality of component carriers.

2. The UE of claim 1, wherein the one or more processors are individually or collectively further operable to execute the code to cause the UE to:
determine, based at least in part on the control information, a distribution of assignments of the first quantity of antennas across one or more component carriers of the plurality of component carriers, wherein receiving the downlink transmissions is in accordance with the distribution of assignments of the first quantity of antennas, wherein the distribution of assignments comprises assignment of different quantities of antennas to different downlink time periods in the one or more component carriers.

3. The UE of claim 1, wherein the one or more processors are individually or collectively further operable to execute the code to cause the UE to:

receive control information indicating a plurality of slot formats for a plurality of slots associated with one or more component carriers of the plurality of component carriers based at least in part on transmitting the indication; and determine, based at least in part on the plurality of slot formats, a distribution of assignments of the first quantity of antennas across the one or more component carriers for the plurality of slots, wherein receiving the downlink transmissions is in accordance with the distribution of assignments of the first quantity of antennas.

4. The UE of claim 1, wherein the one or more processors are individually or collectively further operable to execute the code to cause the UE to:

receive control information indicating one or more maximum quantities of antennas with which the UE is to receive the downlink transmissions over respective component carriers of the plurality of component carriers based at least in part on transmitting the indication; and determine, based at least in part on the one or more maximum quantities, a distribution of assignments of the first quantity of antennas across the respective component carriers, wherein receiving the downlink transmissions is in accordance with the distribution of assignments of the first quantity of antennas.

5. The UE of claim 1, wherein:

the capability of the UE further indicates a second quantity of antennas with which the UE is capable of receiving the downlink transmissions over a single component carrier of the plurality of component carriers; and receiving the downlink transmissions comprises receiving the downlink transmissions in accordance with the second quantity of antennas.

6. The UE of claim 5, wherein the second quantity of antennas is based at least in part on a bandwidth associated with the single component carrier.

7. The UE of claim 6, wherein the bandwidth associated with the single component carrier is a downlink component carrier bandwidth, an active downlink bandwidth part bandwidth, or a bandwidth of a downlink data channel.

8. The UE of claim 1, wherein the first quantity of antennas is based at least in part on a bandwidth associated with the plurality of component carriers.

9. The UE of claim 8, wherein the bandwidth associated with the plurality of component carriers is a downlink component carrier bandwidth, an active downlink bandwidth part bandwidth, or a bandwidth of a downlink data channel.

10. The UE of claim 1, wherein the capability of the UE further indicates one or more distributions of assignments of the first quantity of antennas across the plurality of component carriers.

11. The UE of claim 1, wherein the capability of the UE further indicates one or more antennas of the first quantity of antennas that are permitted to receive the downlink transmissions only on a subset of the plurality of component carriers.

12. The UE of claim 1, wherein the capability of the UE further indicates that any of the first quantity of antennas are permitted to receive the downlink transmissions on any of the plurality of component carriers.

13. The UE of claim 1, wherein the one or more processors are individually or collectively further operable to execute the code to cause the UE to:

transmit a requested distribution of assignments of the first quantity of antennas across at least the subset of the plurality of component carriers, wherein receiving the downlink transmissions comprises receiving the downlink transmissions in accordance with the requested distribution of assignments of the first quantity of antennas.

14. The UE of claim 1, wherein the one or more processors are individually or collectively further operable to execute the code to cause the UE to:

receive, in accordance with the capability of the UE, control information scheduling transmission of the downlink transmissions over at least the subset of the plurality of component carriers.

15. The UE of claim 1, wherein the one or more processors are individually or collectively further operable to execute the code to cause the UE to:

transmit an indication of a requested slot format pattern for communications, wherein receiving the downlink transmissions comprises receiving the downlink transmissions in accordance with the requested slot format pattern.

16. The UE of claim 1, wherein:

the capability of the UE comprises a capability to receive the downlink transmissions over a quantity of communications layers that is different than the first quantity of antennas.

17. The UE of claim 1, wherein:

the capability of the UE is enabled based at least in part on the downlink transmissions being scheduled in one or more frequency bands that support the capability of the UE, one or more band combinations that support the capability of the UE, one or more frequency ranges that support the capability of the UE, or any combination thereof.

18. A method for wireless communications at a user equipment (UE), comprising:

transmitting an indication of a capability of the UE to receive downlink transmissions over a plurality of component carriers with a first quantity of antennas;

receiving control information scheduling the downlink transmissions over a subset of the plurality of component carriers based at least in part on transmitting the indication, wherein the control information specifies one or more durations for switching antennas following at least one downlink transmission of the downlink transmissions, and wherein the one or more durations are defined as time periods for processing the downlink transmissions; and receiving, in accordance with the indication of the capability of the UE, the downlink transmissions with at least the subset of the first quantity of antennas and over at least a subset of the plurality of component carriers.

19. The method of claim 18, further comprising:

determining, based at least in part on the control information, a distribution of assignments of the first quantity of antennas across one or more component carriers of the plurality of component carriers, wherein receiving the downlink transmissions is in accordance with the distribution of assignments of the first quantity of antennas, where the distribution of assignments comprises assignment of different quantities of antennas to different downlink time periods in the one or more component carriers.

20. The method of claim 18, further comprising:

receiving control information indicating a plurality of slot formats for a plurality of slots associated with one or more component carriers of the plurality of component carriers based at least in part on transmitting the indication; and determining, based at least in part on the plurality of slot formats, a distribution of assignments of the first quantity of antennas across the one or more component carriers for the plurality of slots, wherein receiving the downlink transmissions is in accordance with the distribution of assignments of the first quantity of antennas, where the distribution of assignments comprises assignment of different quantities of antennas to different downlink time periods in the one or more component carriers.

21. The method of claim 18, further comprising:

receiving control information indicating one or more maximum quantities of antennas with which the UE is to receive the downlink transmissions over respective component carriers of the plurality of component carriers based at least in part on transmitting the indication; and determining, based at least in part on the one or more maximum quantities, a distribution of assignments of the first quantity of antennas across the respective component carriers, wherein receiving the downlink transmissions is in accordance with the distribution of assignments of the first quantity of antennas, where the distribution of assignments comprises assignment of different quantities of antennas to different downlink time periods in the respective component carriers.

22. The method of claim 18, wherein:

the capability of the UE further indicates a second quantity of antennas with which the UE is capable of receiving the downlink transmissions over a single component carrier of the plurality of component carriers; and receiving the downlink transmissions comprises receiving the downlink transmissions in accordance with the second quantity of antennas.

23. The method of claim 18, wherein the first quantity of antennas is based at least in part on a bandwidth associated with the plurality of component carriers.

24. The method of claim 18, wherein the capability of the UE further indicates one or more distributions of assignments of the first quantity of antennas across the plurality of component carriers.

25. The method of claim 18, wherein the capability of the UE further indicates one or more antennas of the first quantity of antennas that are permitted to receive the downlink transmissions only on a subset of the plurality of component carriers.

26. The method of claim 18, wherein the capability of the UE further indicates that any of the first quantity of antennas are permitted to receive the downlink transmissions on any of the plurality of component carriers.

27. The method of claim 18, further comprising:

transmitting a requested distribution of assignments of the first quantity of antennas across at least the subset of the plurality of component carriers, wherein receiving the downlink transmissions comprises receiving the downlink transmissions in accordance with the requested distribution of assignments of the first quantity of antennas.

28. A user equipment (UE) for wireless communications, comprising:

means for transmitting an indication of a capability of the UE to receive downlink transmissions over a plurality of component carriers with a first quantity of antennas;

means for receiving control information scheduling the downlink transmissions over a subset of the plurality of component carriers based at least in part on transmitting the indication, wherein the control information specifies one or more durations for switching antennas following at least one downlink transmission of the downlink transmissions, and wherein the one or more durations are defined as time periods for processing the downlink transmissions; and means for receiving, in accordance with the indication of the capability of the UE, the downlink transmissions with at least the subset of the first quantity of antennas and over at least a subset of the plurality of component carriers.

29. A non-transitory computer-readable medium storing code for wireless communications, the code comprising instructions executable by one or more processors to:

transmit an indication of a capability of a user equipment (UE) to receive downlink transmissions over a plurality of component carriers with a first quantity of antennas;

receive control information scheduling the downlink transmissions over a subset of the plurality of component carriers based at least in part on transmitting the indication, wherein the control information specifies one or more durations for switching antennas following at least one downlink transmission of the downlink transmissions, and wherein the one or more durations are defined as time periods for processing the downlink transmissions; and receive, in accordance with the indication of the capability of the UE, the downlink transmissions with at least the subset of the first quantity of antennas and over at least a subset of the plurality of component carriers.

* * * * *